United States Patent [19]

Baden et al.

[11] Patent Number: 4,564,219
[45] Date of Patent: Jan. 14, 1986

[54] APPARATUS FOR ADJUSTING THE HEIGHT OF THE UPPER FITTING FOR THE SHOULDER BELT IN A SAFETY BELT SYSTEM

[75] Inventors: Hans Baden, Norderstedt; Klaus Kühnemann, Willich; Gerhard Sedlmayr, Hamburg; Klaus Straszewski, Quickborn; Monika Zeumer, Hamburg, all of Fed. Rep. of Germany

[73] Assignee: Autoflug GmbH, Rellingen, Fed. Rep. of Germany

[21] Appl. No.: 511,170

[22] PCT Filed: Oct. 1, 1982

[86] PCT No.: PCT/DE82/00193
  § 371 Date: Jun. 2, 1983
  § 102(e) Date: Jun. 2, 1983

[87] PCT Pub. No.: WO83/01233
  PCT Pub. Date: Apr. 14, 1983

[30] Foreign Application Priority Data

Oct. 3, 1981 [DE] Fed. Rep. of Germany ....... 3139419
Oct. 6, 1981 [DE] Fed. Rep. of Germany ....... 3139624
Oct. 7, 1981 [DE] Fed. Rep. of Germany ....... 3139822
Oct. 21, 1981 [DE] Fed. Rep. of Germany ....... 3141702

[51] Int. Cl.[4] ............................................. B60R 21/10
[52] U.S. Cl. .................................................. 280/808
[58] Field of Search ...................... 280/801, 804, 808; 297/468, 482, 483

[56] References Cited

FOREIGN PATENT DOCUMENTS 2303222 8/1974 Fed. Rep. of Germany .
2412253 9/1975 Fed. Rep. of Germany ...... 280/801
2603979 8/1976 Fed. Rep. of Germany .
2530977 1/1977 Fed. Rep. of Germany .
2655995 6/1978 Fed. Rep. of Germany .
3126868 7/1981 Fed. Rep. of Germany .
2362641 3/1978 France ............................... 280/808
2484343 12/1981 France .

Primary Examiner—Joseph F. Peters, Jr.
Assistant Examiner—Ross Weaver
Attorney, Agent, or Firm—Becker & Becker, Inc.

[57] ABSTRACT

An apparatus for adjusting the height of the upper fixing or guide fitting for the shoulder belt of a safety belt system, particularly in motor vehicles. The apparatus includes a guide rail mounted on part of the vehicle body, and has a guide slot and recesses in which at least one associated locking member engages. This locking member is mounted on a sliding member which carries the fixing or guide fitting and is capable of being locked in or released from the recesses via a handle. The locking member or locking members are symmetrical in construction with regard to their locking function, are mounted on the sliding member, and are operative in the guide rail, and especially are operative on both sides of the central longitudinal line of the guide rail. Moreover, the handle is designed, by a finger pressure construction, to be operated with substantially no force of the hand and arm, using one hand. The belt looping axis at the fixing or guide fitting is located outside, especially below, the zone in which the forces are transmitted along a plane, a line, or point-wise between the locking member or locking members and the guide rail when the apparatus is in the locked position.

35 Claims, 32 Drawing Figures

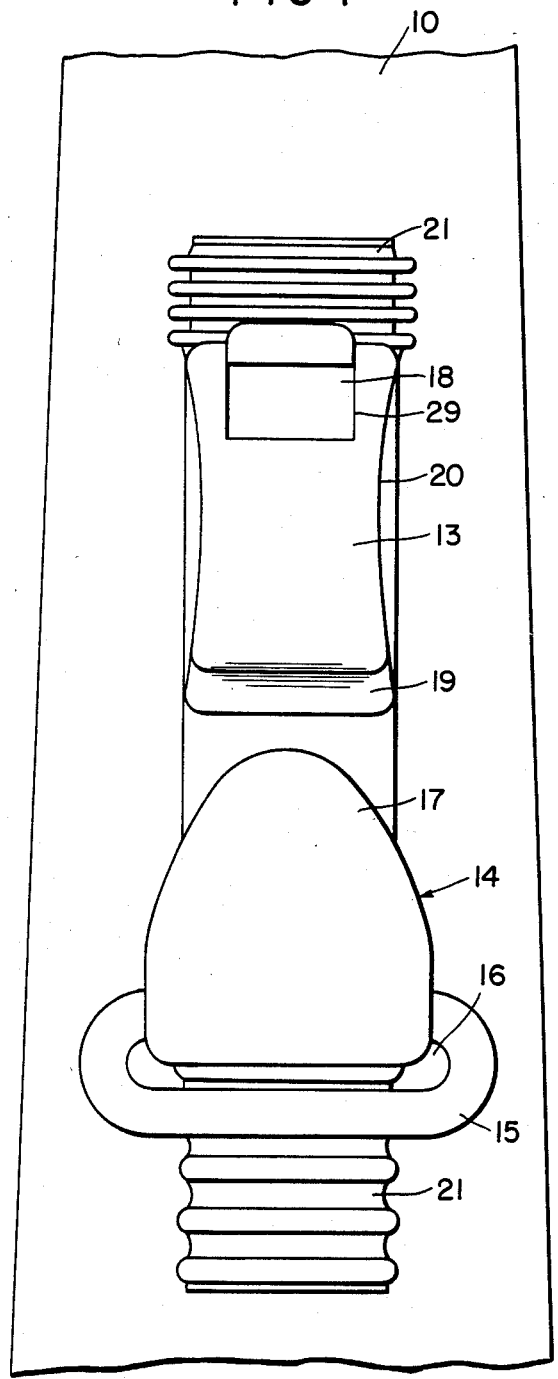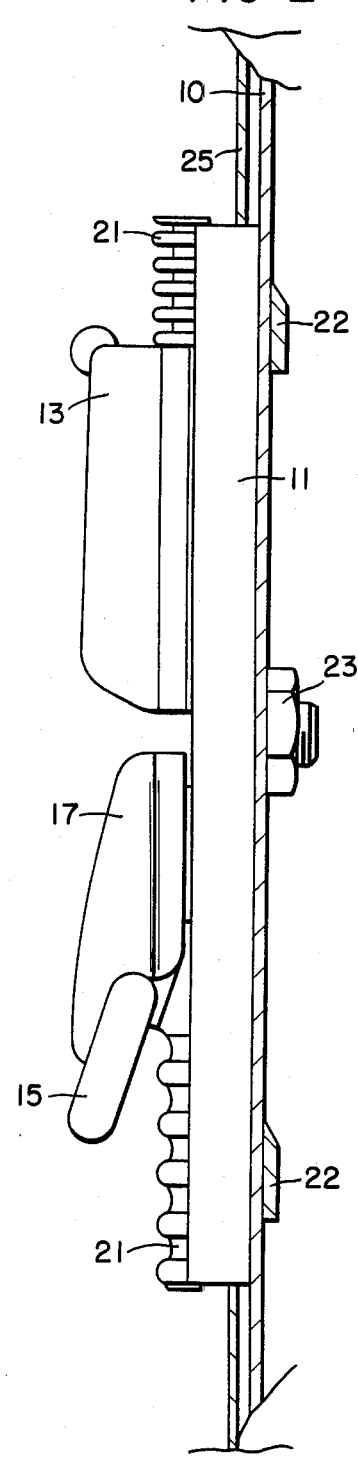

FIG-3
FIG-4
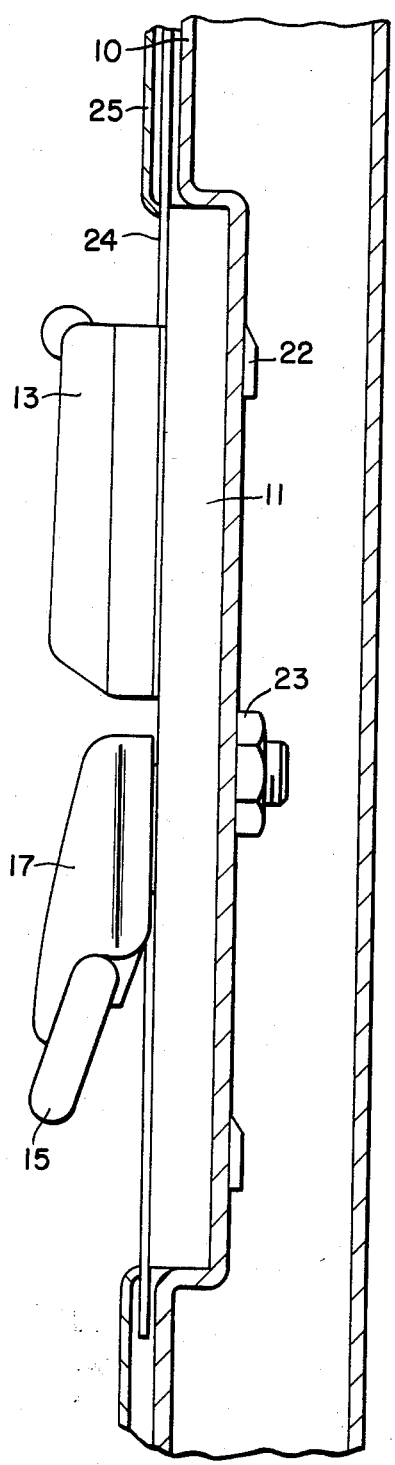
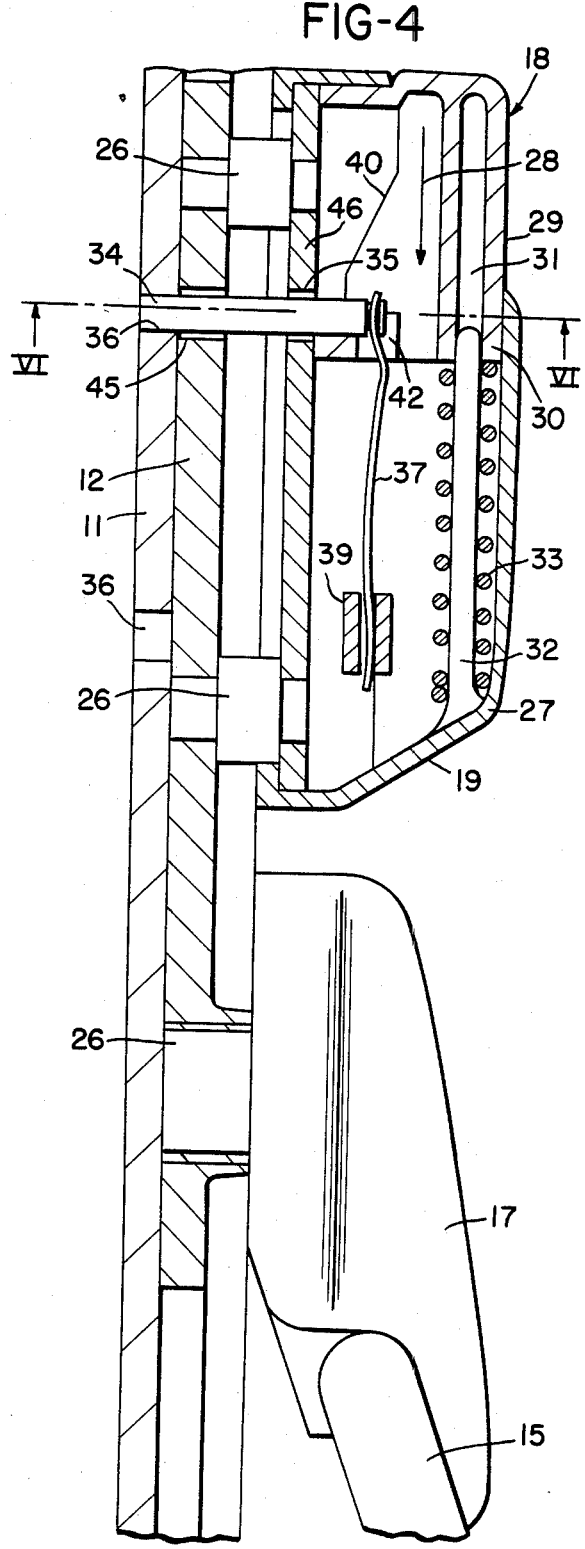

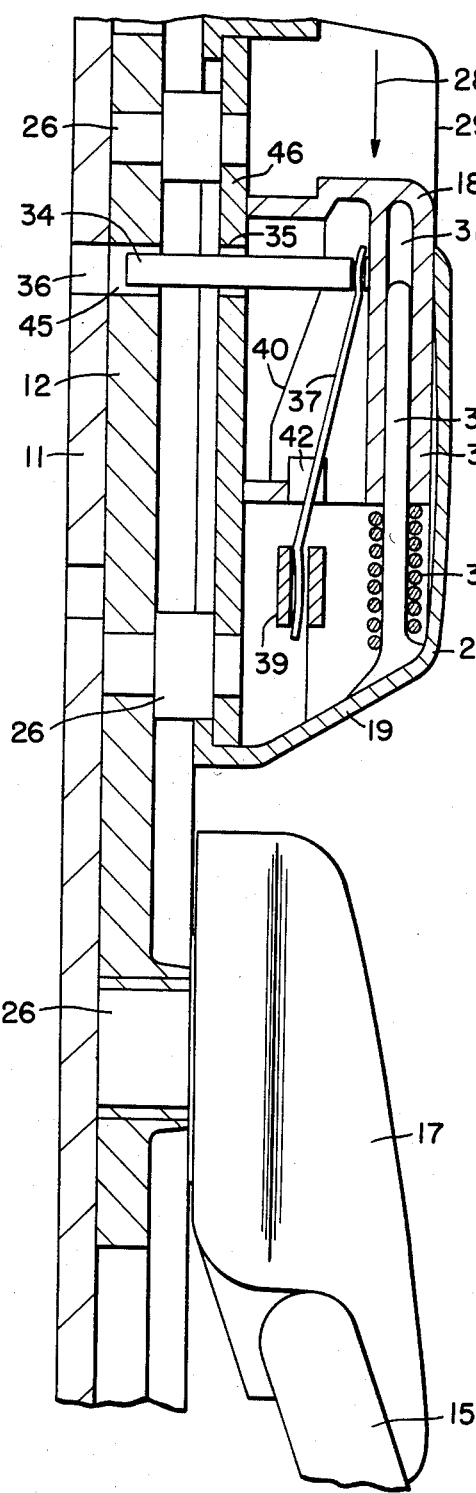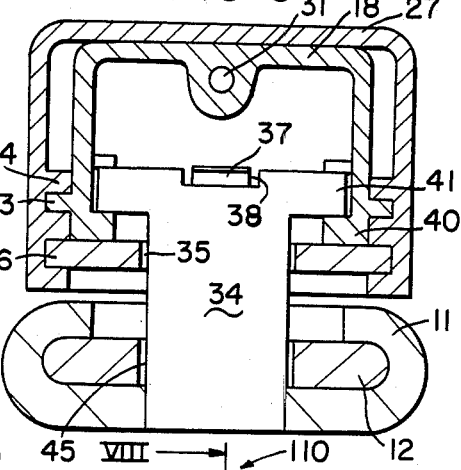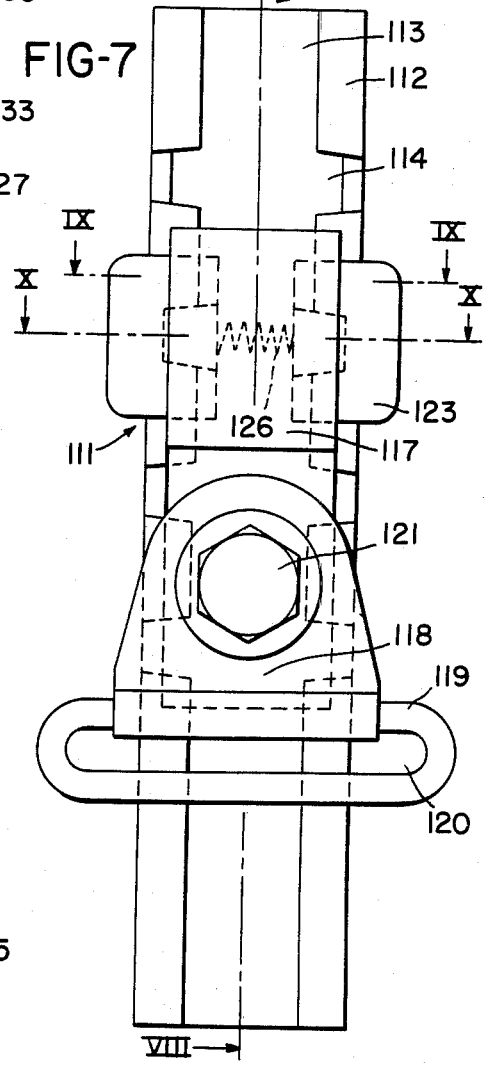

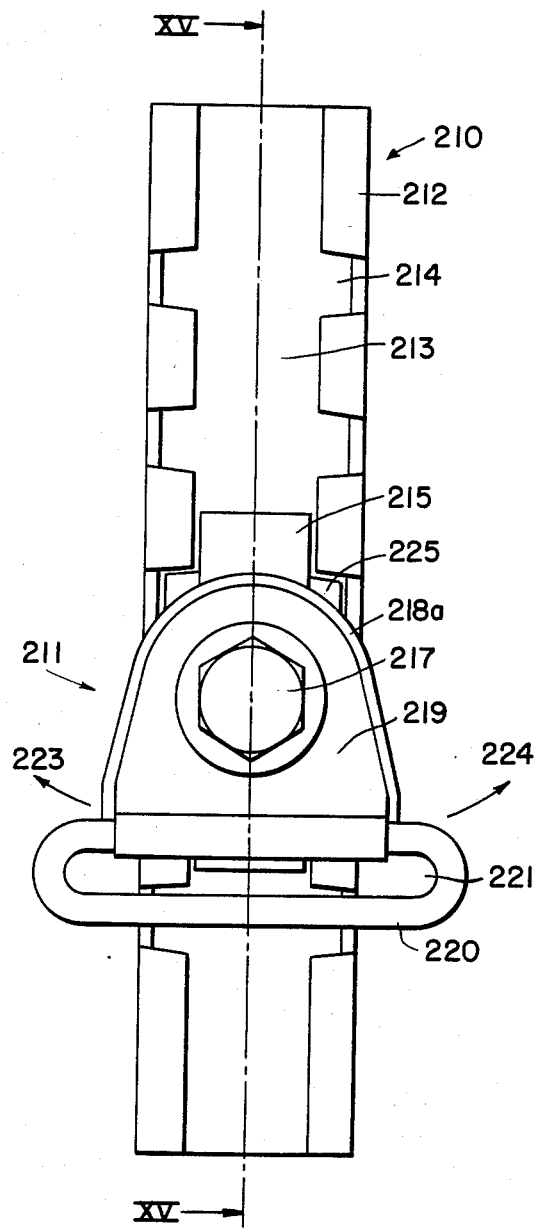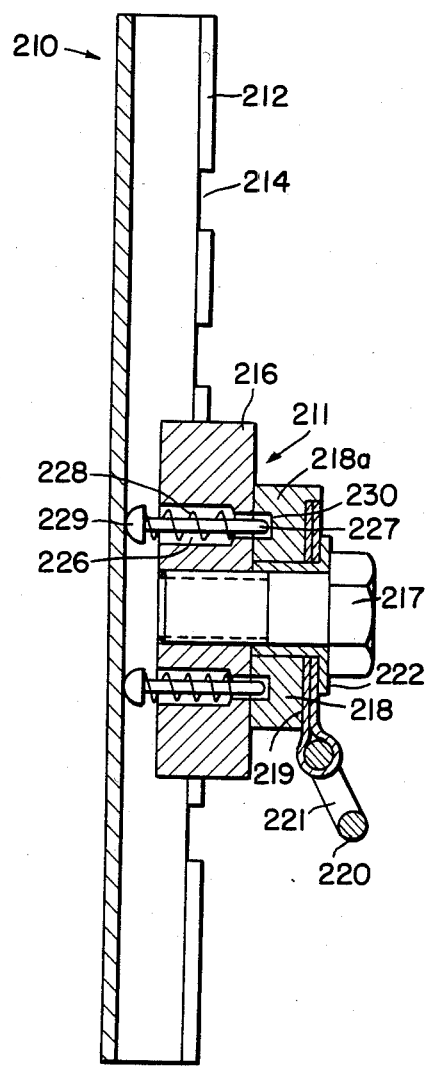

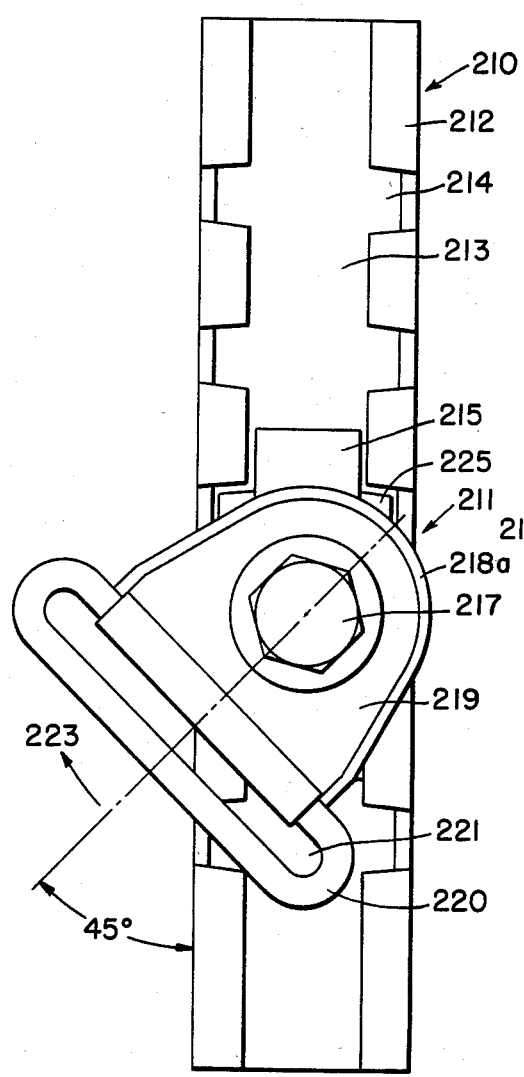
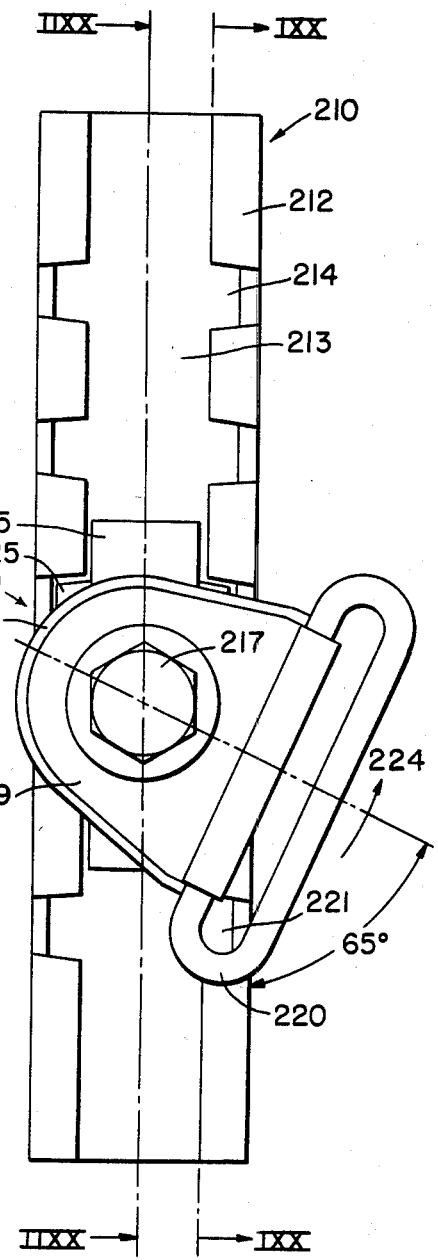
FIG-16
FIG-17

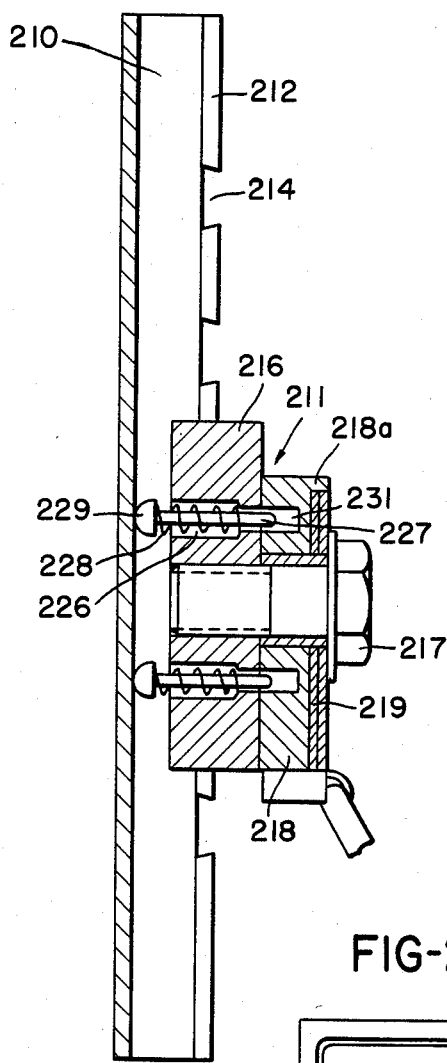
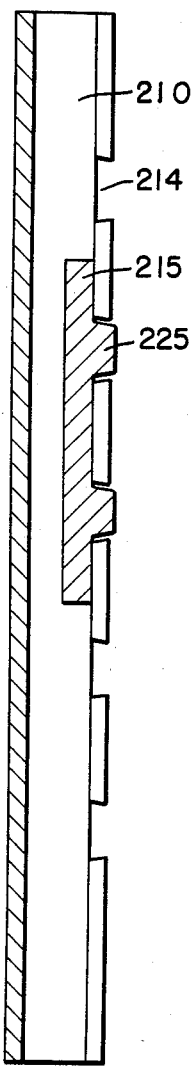
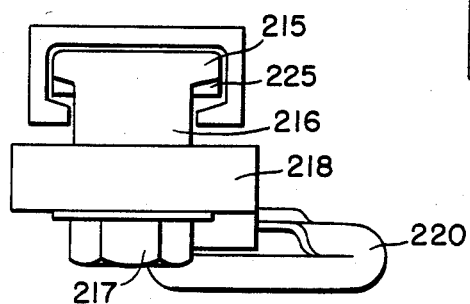

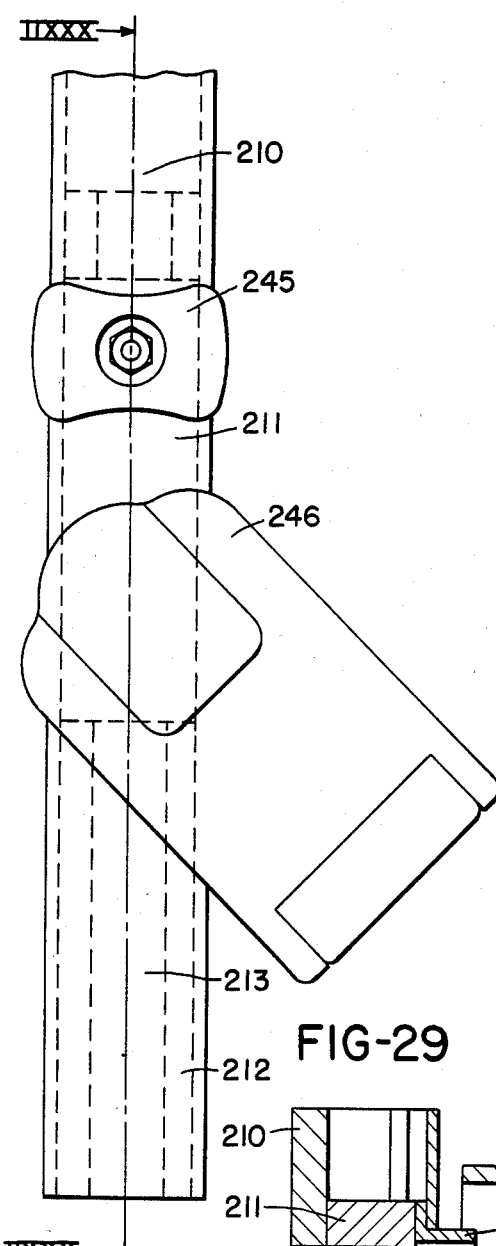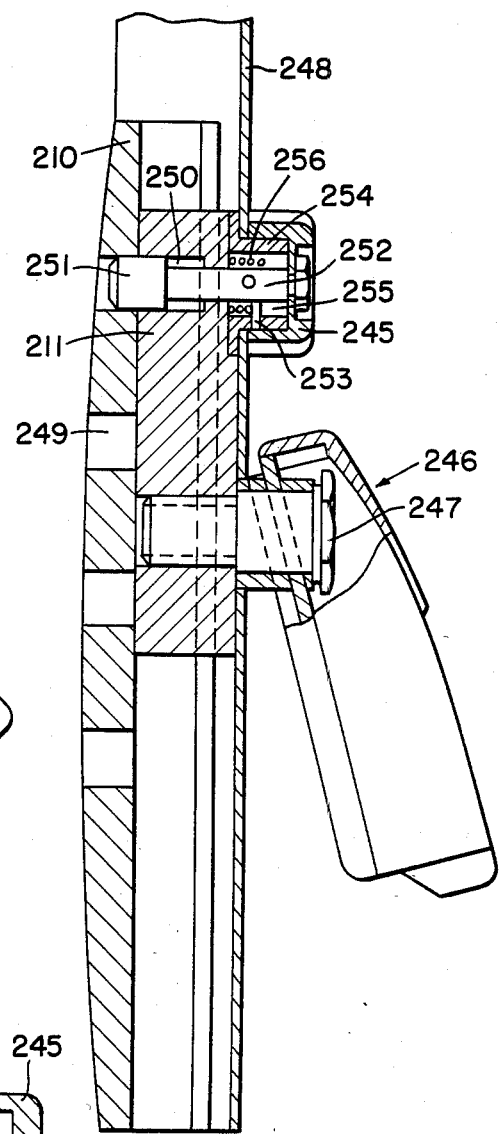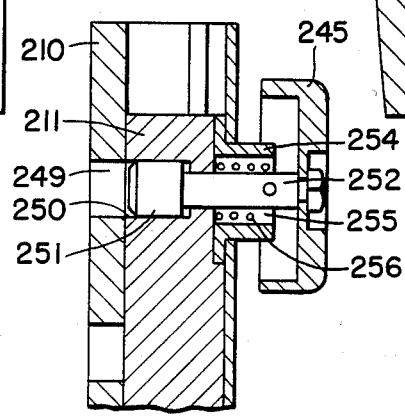

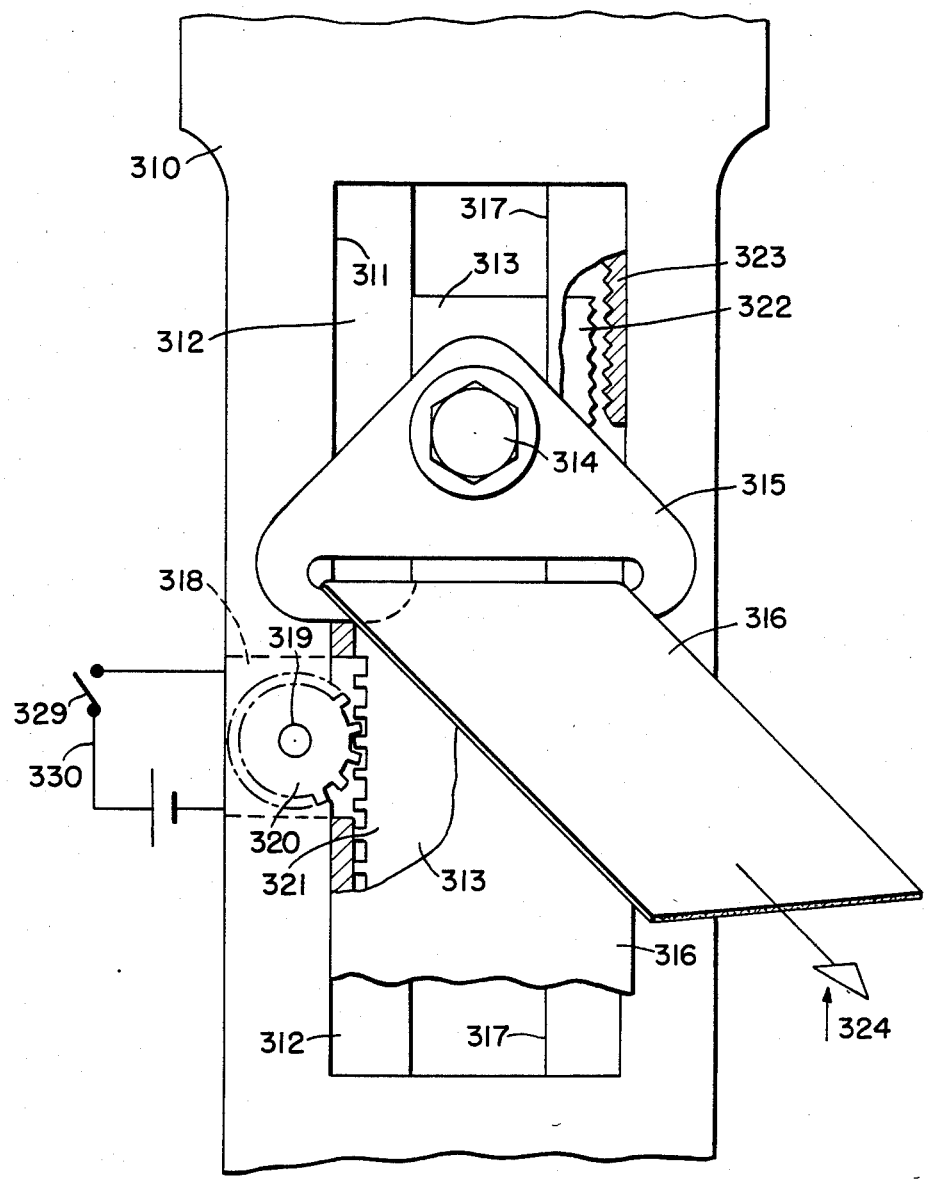

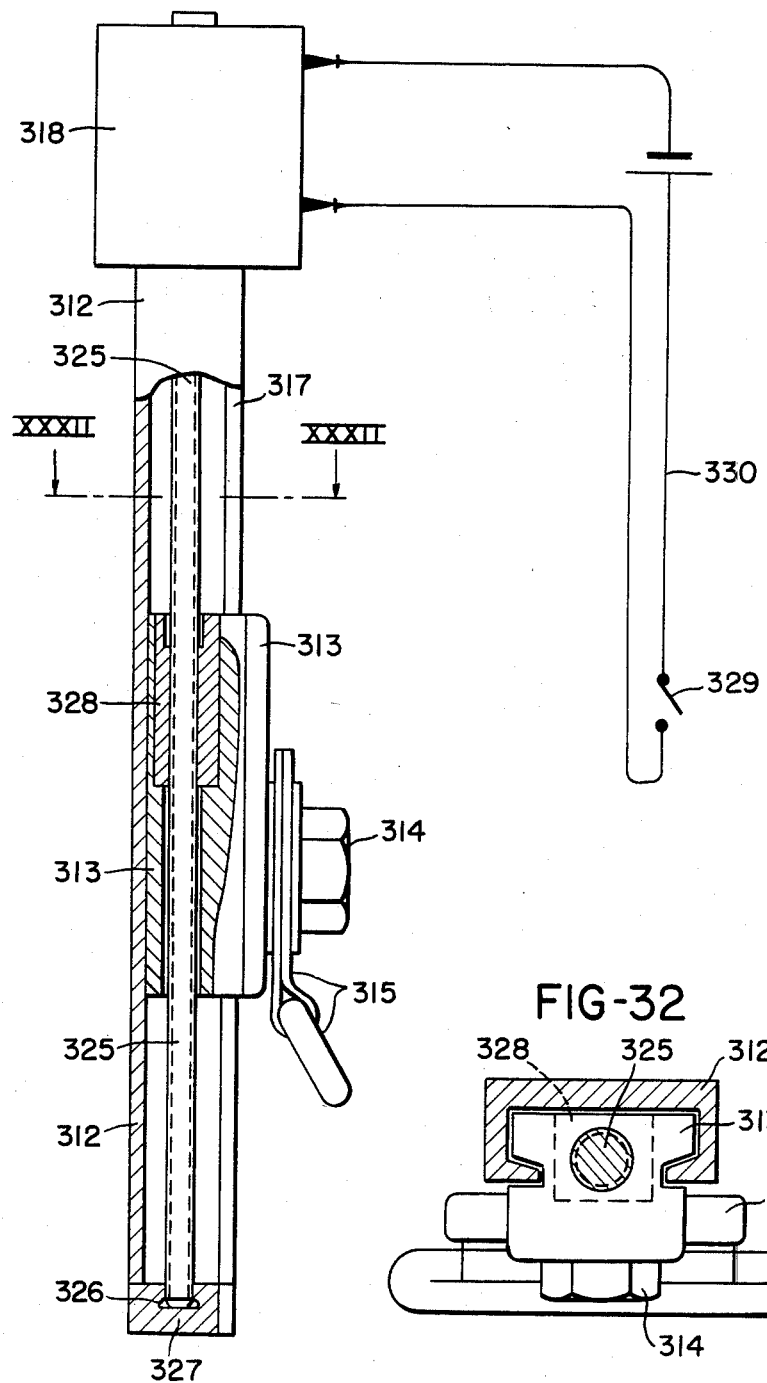

APPARATUS FOR ADJUSTING THE HEIGHT OF THE UPPER FITTING FOR THE SHOULDER BELT IN A SAFETY BELT SYSTEM

BACKGROUND OF THE INVENTION

1. Field of the Invention

The invention relates to an apparatus for adjusting the height of the upper fixing or guide fitting for the shoulder belt of a safety belt system, particularly in motor vehicles. The apparatus includes a guide rail mounted on part of the vehicle body, having a guide slot and recesses in which at least one associated locking member engages. This locking member is mounted on a sliding member which carries the fixing or guide fitting and is capable of being locked into or released from the recesses by means of a handle.

2. Description of the Prior Art

German Offenlegungsschrift No. 26 25 572 (Daimler-Benz) discloses a vertically adjustable fitting of the kind described above wherein the locking of the sliding member carrying the fitting in the guide rail is effected by locking cams located on the sliding member engaging in recesses provided on both sides of the guide slot. The sliding member with its locking cams is pressed towards the upper part of the guide rail and into the associated recesses by spring force acting at right angles to the guide rail. The fitting is adjusted by manual pressure on a fixing screw provided on the sliding member or on a cover held by this screw, which serves as a handle. Under the effect of the pressure applied by the hand, the sliding member moves into the guide rail, counter to the spring force, until the locking cams are disengaged from the recesses in the perpendicular direction. In this pressed-in state, the sliding member with fitting is then vertically adjustable in the guide rail.

The apparatus as disclosed in German Offenlegungsschrift No. 26 25 572 (Daimler-Benz) has the advantage that the locking mechanism can become disengaged when the vehicle is subjected to strong lateral impact, since relatively heavy parts such as the fitting with the fixing screw and sliding member are supported only against the action of a simple helical spring.

German Offenlegungsschrift No. 26 55 995 (Porsche) also discloses a vertically adjustable guide fitting for a safety belt wherein disengagement is effected by moving the sliding member into the interior of the guide rail, said disengagement being achieved by turning a screw in this case. The screw simultaneously serves as a movable fastening for the guide fitting, with the consequent disadvantage being that the sliding member in the guide rail may become detached under certain unfavorable circumstances.

German Offenlegungsschrift No. 23 03 222 (Opel) also discloses an apparatus with features of the kind described hereinbefore, wherein the sliding member is adjusted by pressing with the hand against the force of a spring onto the head of a screw and subsequently moving the sliding member in the perpendicular direction. This apparatus also is not absolutely safe if the vehicle is subjected to a violent lateral impact.

Moreover, German Offenlegungsschrift No. 26 03 979 (Håkanssons) describes a vertically adjustable fitting with a guide rail and sliding member, wherein a small hand wheel is provided on the sliding member and the rotation of this wheel spreads open two bolts. These bolts then jam inside the guide rail fixing the sliding member in position. Thus, the sliding member is held here in its prescribed vertical position by friction alone, which may be very unsafe if there is any wear on the bolts.

German Offenlegungsschrift No. 24 12 253 (Schlegelmilch) also discloses a guide rail wherein a sliding member is clamped by a jamming action and a small handwheel is provided on a screw to operate therewith. At the same time, this specification discloses the arrangement of a threaded spindle in a guide rail wherein the associated sliding member can be moved up and down by rotating the spindle by means of a handwheel.

The vertical adjustment devices as disclosed in the prior art as a whole, do not give sufficient consideration to the important aspect of comfort when the safety belts are fastened by the driver and passengers. The comfort of wearing the belt has a critical influence on the wearing rate and hence on the safety of the person in the vehicle, more particularly a motor vehicle. In other words the more comfortable the belt is to fasten, the more likely it is to be worn.

As shown in the prior art, vertical adjustment of the fitting is difficult and uncomfortable for the user to carry out. In fact, the fitting can really be adjusted only after the person has climbed in and correctly positioned the vehicle seat. The adjustment apparatus then is generally behind the user and above his shoulder. In this position, the simultaneous sequence of movements required to disengage and adjust the fitting, with the directional movements required with known apparatus, are very uncomfortable for the user to carry out, particularly as the freedom of movement of the user is restricted by the belt which is already fitted over the body.

SUMMARY OF THE INVENTION

An object of the present invention is to provide an apparatus of the type under consideration that is safe when the vehicle is subjected to violent impact and wherein the comfort of operation for adjusting the height of the fixing or guide fitting and hence for better adapting the belt configuration to the sitting position of the user is improved substantially.

This aim is realized by an apparatus which is characterized in that the locking member or locking members are symmetrical in construction with regard to their locking function, are mounted on the sliding member, and are operative in the guide rail, and especially are operative on both sides of the central longitudinal line of the guide rail; moreover, the handle is designed, by a finger pressure construction, to be operated with substantially no force of the hand and arm, using one hand; the belt looping no force of the hand and arm, using one hand; the belt looping axis at the fixing or guide fitting is located outside, especially below, the zone in which the forces are transmitted along a plane, a line, or a point-wise between the locking member or locking members and the guide rail when the apparatus is in the locked position.

Pursuant to further advantageous embodiments and features of the present invention, the sliding member with the locking member may be constructed in the form of a sliding key movable parallel to the guide rail in the manner of a known belt buckle having a PRESS button, and, by means of suitable configurations, controls the longitudinal movements of the spring-loaded locking member, which is movable at right angles to the direction of sliding. The sliding key may be mounted in a housing which guides it in a straight line, this housing having a shoulder which is located opposite the finger place on the sliding key for one-handed operation of the sliding member, which has the fixing or guide fitting. The housing may be provided with finger depressions along its longitudinal sides.

The sliding key may be provided with projections or the like which overlap the locking member in the locking position and prevent the release thereof.

Inside the housing a leaf spring may be clamped in position, the free end of which is mounted on the locking member so as to act towards the locking position.

Inside the housing there may be provided a guide element which penetrates a matching configuration in the sliding key or vice versa, while between the guide element and the configuration on the sliding key there is a compression spring, especially a helical compression spring.

The sliding key may have at least one ramp-like arrangement along which the locking member slides up and down with an associated surface over the distance required for release.

The housing may have a base plate which is spaced from the sliding member and has an opening for the locking member, the opening being aligned with a corresponding opening in the sliding member for guiding the locking member.

The sliding key may be box-shaped and, for limiting the sliding movement, may be provided with at least one abutment surface extending at right angles to the direction of sliding.

The housing and the sliding key may be held and guided relative to one another by means of cooperating tongue and groove-type arrangements.

The locking member may be formed as a flat T-shaped stamped sheet metal part.

Three bolt connections may be provided between the sliding member on the one hand and the buckle housing and fitting on the other hand.

The sliding member may at least indirectly support a cover plate moving therewith for the guide rail. The cover plate may be constructed in two parts, and may be fixed both to the housing and also to the fitting.

Between the sliding member with the components carried thereby, on the one hand, and the adjacent components integral with the vehicle, on the other hand, there may be at least one sleeve which receives and bridges any changes in length. The sleeve may be constructed as a concertina or bellows-like arrangement. The sliding member may have a concertina at both ends.

Two locking members in the form of locking cams may be provided which engage in recesses on both sides of the guide rail under spring pressure and, as parts of actuating elements amounted in the sliding member in such a way as to be movable in opposite directions, are movable into the locking position at right angles to the guide rail, the actuating elements being constructed in the form of two push buttons. The sliding member may comprise a sliding shoe which is movable in the guide rail, and a carrier member which is connected to the sliding shoe by means of a web which passes through the guide slot; the push buttons may be mounted in the carrier member and may be movable at right angles to the sliding member, these push buttons projecting out of the carrier member on both sides thereof. The locking cams engaging in the recesses of the guide rail may be mounted on the two facing inner sides of the push buttons. The buttons with locking cams may be forced apart by a spring which is constructed as a helical spring and is inserted and guided in bores in the push buttons.

The carrier member, in the region of the locking cams between the push buttons, may include a recess which receives the locking cams when the push buttons are compressed.

The recesses in the guide flaps of the guide rail may have trapezoidal configurations, with the shorter base line being located on the outside of the guide rail; the locking cams may have corresponding inclined surfaces.

The handle may be rotatably mounted and may be coupled to the locking member in such a way that the sliding member can, by turning the handle, be released with one hand to adjust the height. The fixing or guide fitting may be constructed as a handle. The fitting may be indirectly coupled to the locking members of the sliding member, which locking members are formed as locking cams. The sliding member, which is spring loaded at right angles to the guide rail, may comprise a sliding shoe which is movable in the guide rail, with locking cams formed thereon, and a web which passes through the guide slot of the guide rail; a cam member, which is fastened so as to be rotatable on the web, may be provided which secures or releases the sliding member by rotation in the rail; on the cam member may be fixed the fitting for the guidance and deflection of the belt, and on the outer edge of the cam member may be mounted a circumferential projection which encloses the fitting in such a way that the cam member can be made to rotate by rotation of the fitting. The sliding member, with the cam member, can only be pressed into the guide rail if the cam member or fitting is pivoted through about 65° counter to the direction of travel. The cam member is held in all the other positions by locking means at a distance from the base of the guide rail.

The locking means may comprise at least one securing pin which is inserted in a continuous bore provided in the sliding shoe and in the web, and rests on the bottom of the guide rail with a round-headed arrangement, with the length thereof projecting beyond the height of the sliding shoe and the web. The diameter of the bore in the sliding shoe with the web may correspond at least partially to the diameter of the head of the securing pin and is thus larger than in the rear part of the bore. In the region of the larger diameter of the bore, a helical spring may be pushed onto the securing pin; this helical spring rests on the head and on the shoulder of the bore and braces the sliding member against the bottom of the guide rail.

The cam member, on its side facing the sliding shoe, may have a curved recess for receiving that end of the securing pin which projects over the sliding shoe and the web, with the end of the securing pin being guided in this recess when the cam member is rotated; the depth of the recess corresponds to the amount by which the securing pin projects over the web. A depression may be provided on that end of the recess which corresponds to the rotation of the cam member counter to the direction of travel, this depression being deeper than the curved recess by the extent of penetration of the sliding member into the guide rail.

The fitting, acting as a handle, may be coupled directly to the locking member. A circular disc which rotates with the fitting may be mounted between the sliding member and the fitting. This circular disc projects, with a substantially rectangular projection, as a locking member into the guide rail, with the projection engaging in recesses in the guide flaps of the guide rail. The fitting with the circular disc and projection can be pivoted out of the belt removal position through about a quarter circle into the buckling position and into the adjusting position; in this way the projection can be locked to the guide rail. The projection of the circular disc may be formed by a segment of a circle bounded by two parallel chords corresponding in spacing to the width of the guide slot of the guide rail, with this segment forming a right angle with the longitudinal axis of the guide rail in the locking position of the apparatus. The recesses in the guide flaps of the guide rail may be circular, corresponding to the radius of the circular disc. The opposing recesses may, offset at their upper and lower ends, include stops for the projection of the circular disc, with the vertical spacing of the stops corresponding to the segment height of the projection of the circular disc.

A rotary knob known per se may be mounted as a handle on the sliding member, separately from the fitting, for the purpose of releasing the locking member; the sliding member may have a bore for receiving a bolt movable in the bore, as a locking member, the bolt being arranged at the base of a control rod connected to the rotary knob. A flanged guide bushing may surround the control rod with play, and a pin, which projects from the control rod, may be guided in the guide means thereof in such a way as to produce longitudinal movements of the control rod. A helical tension spring may be arranged in the annular space between the control rod and the guide bushing, said spring being secured to the guide bushing at one end and to the control rod at the other end.

An electrical device, which can be connected to the electrical supply means, may be provided for releasing and locking the locking member and/or in a manner known per se for moving the sliding member in the guide rail upon selective actuation of the locking means and adjustment by hand or by auxiliary electrical force.

The power take-off member of an electric motor, and the sliding member, may be constructed as a cooperating meshing mechanism for moving the sliding member in the guide rail. The power take-off member may, in a manner known per se, comprise a pinion, and part of the sliding member may be in the form of a toothed rack. A further set of teeth may be provided between the sliding member and the guide rail; due to a corresponding clearance of the sliding member in the guide rail in the transverse direction thereof, these teeth only mesh when the sliding member is pulled with its teeth, under the effect of the belt force, into the teeth of the guide rail, counter to the force of a spring which maintains the clearance. The spring maintaining the clearance between the sliding member and the guide rail may be constructed as a compression-type leaf spring.

A sliding surface for the toothed rack, which has rectangular teeth in the meshing mechanism, may be provided in the guide rail opposite the other set of teeth.

The meshing mechanism, which comprises the pinion and the toothed rack, may be provided with such long teeth or such deep gaps between the teeth that the clearance is bridged, without affecting the meshing engagement of the pinion and toothed rack, when the other set of teeth meshes.

The power take-off member of the electric motor may comprise a threaded spindle, known per se, and a part of the sliding member in the form of a threaded nut. The sliding member may have a longitudinal bore through which the threaded spindle is passed without making contact; a threaded nut, which is comparatively short in relation to the spindle, may be inserted in the longitudinal bore.

The free end of the threaded spindle may be guided in an abutment remote from the motor; this abutment may be constructed as a lower end plate for the guide rail.

The threaded spindle may be arranged along the center of the guide rail in a manner known per se, and may carry a hand wheel which projects with at least a segment through the guide rail into the interior of the vehicle; the motor is located at the upper end of the guide rail.

The drive connection between the electric motor and the driving part of the meshing mechanism may be constructed in the form of a flexible shaft in the manner of a Bowden cable. On the other hand, the driving connection between the electric motor and the driving part of the meshing mechanism may be in the form of a Cardan drive with joints, for example universal or helical spring joints, bridging the change in direction of the drive.

Finally, the fitting may be in the form of an emergency buckle for the safety belt.

The crux of the present invention can be realized in a variety of embodiments. In a preferred embodiment, the invention makes use of the known technology of belt buckles which are familiar to any driver for buckling on and locking the safety belt. In order to open the buckle, the user presses a PRESS button, thereby lifting a locking member out of a recess in the lock and holding it ready in the released position until the belt is buckled on again.

Again, according to the present invention, a button is provided, the construction and method of operation of which corresponds to the known belt buckles. This has the advantage of increasing the ease of handling when fastening and adjusting the belt, since the user is confronted with an operating element which must be familiar to him. This degree of confidence can be increased still further by making the PRESS button a different color.

The apparatus according to the present invention provide the user with a handle which he can grasp and actuate with the fingers, more particularly two or three fingers, in such a way that he need only make hand and arm movements which are comfortable, i.e. he need not stretch over and possibly even hurt himself. This results from a feature according to the present invention, namely that the handle is designed to be operated by finger pressure, to permit actuation with one hand using substantially no force from the hand or arm. As a result, the user is in the position of having to move essentially only the fingers and wrist, but not the whole arm or body, as is unavoidable when force must be applied in the transverse direction of the vehicle. The combination of these measures according to the present invention for increasing comfort with further measures for improving the safety of the position of the fitting, even in the event of transverse forces or components of such forces acting on the vehicle, and moreover a direction of travel of the safety belt through the fitting, which cannot affect the position thereof, constitute the solution according to the invention.

BRIEF DESCRIPTION OF THE DRAWINGS

The drawings show some embodiments by way of example of the invention which are described hereinafter. In the drawings:

FIG. 1 shows the B-column of a motor vehicle with a vertically adjustable fitting, in front elevation;

FIG. 2 shows the B-column with vertical adjustment apparatus in longitudinal section, with a guide rail fitted on the B-column;

FIG. 3 shows the B-column with vertical adjustment apparatus according to FIG. 2, with a guide rail set into the B-column;

FIG. 4 shows the vertical adjustment apparatus in longitudinal section in the locked position;

FIG. 5 shows the object of FIG. 4 in the released position;

FIG. 6 is a cross-sectional view through the apparatus on the line VI—VI in FIG. 4;

FIG. 7 shows a second embodiment of the vertical adjustment apparatus in front elevation;

FIG. 14 is another embodiment of the apparatus in front elevation, with the fitting in the belt removal position;

FIG. 15 shows the apparatus in central longitudinal section on the line XV—XV in FIG. 14;

FIG. 16 shows the apparatus of FIG. 14 with the fitting in the position for putting on the belt;

FIG. 17 shows the apparatus of FIGS. 14 and 16 upon adjustment of the fitting;

FIG. 18 shows the apparatus in central longitudinal section on the line IIXX—IIXX in FIG. 17;

FIG. 19 is a longitudinal section through the apparatus on the line IXX—IXX in FIG. 17, in the locked position;

FIG. 20 is an end elevational view of the apparatus in the position shown in FIG. 17;

FIG. 27 shows another embodiment by way of example of the adjustment apparatus, in a front elevational view;

FIG. 28 shows the apparatus in central longitudinal section taken along the line IIXXX—IIXXX in FIG. 27;

FIG. 29 shows the rotary knob with locking member and control means corresponding to apparatus of FIG. 28, in the released position;

FIG. 30 is a partial view of the inside of a roof post of a vehicle (B-column) with electrical adjustment apparatus;

FIG. 31 shows another electrical adjustment apparatus in a longitudinal section;

FIG. 32 shows a cross-sectional view taken along the line XXXII—XXXII in FIG. 31.

DETAILED DESCRIPTION

Figure 8:
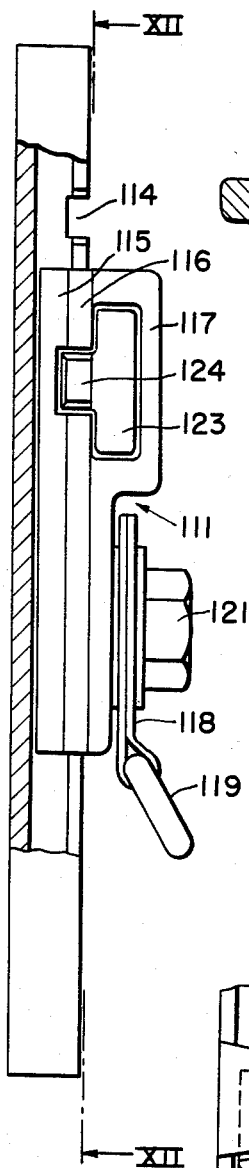
FIG. 8 shows the apparatus according to FIG. 1 in side view, wherein the guide rail is shown partly in section on the line VIII—VIII in FIG. 7.
Figure 9:
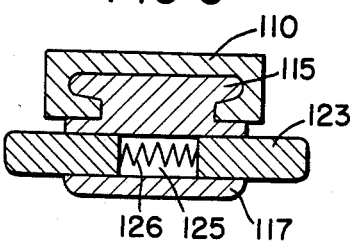
FIG. 9 is a cross-sectional view through the apparatus on the line IX—IX in FIG. 7, in the locked position.

In the embodiment shown in FIGS. 1 to 6, the B-column 10 of a motor vehicle carries a guide rail 11 slotted on one side, in which a sliding member 12 is mounted so as to be longitudinally movable. On the sliding member 12 there are mounted a locking block 13 of the adjustment apparatus and a fixing or guide fitting 14 with a loop 15 and slot 16 for the insertion and guiding of a belt (not shown), the fastening being covered by a cap 17. The locking block 13 is provided at its upper end opposite the fitting 14 with a sliding key 18 and at its lower end with a shoulder 19 as a gripping indentation. On its side edges, the locking block 13 has finger indentations 20.

The guide rail is covered by means of concertinas 21 which are pushed together in the upper region on the locking block 13 in the position of the sliding member 12 shown in FIG. 1, and are pulled apart accordingly in the lower region on the fitting 14.

As shown in FIG. 2, the guide rail 11 for the sliding member 12 with the locking block 13 and fitting 14 may be placed on the B-column 10 of a motor vehicle. Fixing is effected by means of a fishplate connection 22 and a weld nut 23.

As shown in FIG. 3, however, the guide rail 11 may also be set into the B-column 10 and be secured in the same way via a fishplate connection 22 and weld nut 23. The guide rail 11 is covered by a coverplate 24 (not shown in detail here) which extends at the ends of the guide rail 11 to below the cladding 25 of the B-column 10.

FIG. 4 shows the locking mechanism of the locking block 13. The sliding member 12 running in the guide rail 11 carries the locking block 13 and the guide fitting 14, while the components 13, 14 are secured on the sliding member 12 via three bolt-like connecting elements 26 passing through the slot in the guide rail 11. The guide rail 11 or the slot therein is concealed outside the sliding member 12 by the cladding 25.

The locking block 13 includes a fixed housing 27 and the sliding key 18 which is movable in the direction of the arrow 28, while the upper part of the housing has a cutout portion 29 which is filled by the sliding key 18 with a top plate 30 which simultaneously closes off the open end of the housing. The top plate mounted in the cutout portion 29 engages underneath the upper part of the housing and has a bore 31 which engages round a pin 32 mounted inside the housing 27 and is guided thereon when the sliding key 18 is moved along in the direction of the arrow 28. Along the pin 32 of the housing 27 there is a helical compression spring 33 which is supported between the end of the sliding key top plate 30 and the closed side of the housing 27.

In order to guide the sliding key 18 further in the housing 27 the sliding key 18 comprises, on each of its lateral surfaces, an outwardly directed strip 43 which slides in rails 44 engaging around the same and being formed on the inner sides of the housing 27 (FIG. 6), thus producing a tongue and groove arrangement.

In the area of overlap between the housing 27 and the sliding key top plate 30, there is provided a T-shaped locking member 34 which is movable at right angles to the housing 27 and relative to the guide rail 11 and which is guided in correspondingly aligned openings 35, 45 in the base plate 46 of the housing 27 and of the sliding member 12 and, in the locked position shown in FIG. 4, engages in associated recesses 36 in the guide rail 11. At its upper end projecting into the interior of the housing 27, the locking member 34 is loaded by a leaf spring 37, one end of which is placed in a recess 38 in the surface of the locking member 34, while the other end is clamped at 39 to the closed part of the housing 27.

On each of the two inner side walls of the sliding key 18, there is provided a ramp-like projection 40 as a guide, which extends from the front end of the sliding key 18 as an inclined plane downwards towards the locking member 34, resting with shoulders 41 on the projections 40. At the front end, the projections 40 merge into hook-shaped arrangements 42 which engage over the locking member 34 from above at both ends, resting on the shoulders 41.

The adjustment apparatus described hereinbefore operates as follows: in the locked position shown in FIG. 4, the locking member 34 extends through the openings 35, 45 in the housing base 46 and locking member 12 into the recesses 36 in the guide rail 11 and thus locks the sliding member 12 to the guide rail. At its upper end, the locking member 34 is gripped by the hooks 42 of the sliding key 18 and is thus secured in the locked position against moving out, for example as a result of transverse acceleration forces. When the sliding key 18 is actuated in the direction of the arrow 28 (FIG. 5), the hooks 42 release the locking member 34, and as the sliding key 18 is pushed in further, the locking member 34 is lifted out of the recess 36 in the guide rail 11 by means of its guide, by the shoulders 41 abutting on the inclined projections 40 of the sliding key 18. The sliding member 12 with its guide fitting 14 is then movable into another position in the guide rail.

As a result of the vertical movement of the locking member 34 on actuation of the sliding key 18, the leaf spring 37 is simultaneously tensioned and this leaf spring 37 causes the locking member 34 to engage in the next recess 36 in the guide rail 11 after the release of the sliding key 18, which in turn returns to its original position under the effect of the compression spring 33 tensioned by the insertion. This ensures that no spurious locking occurs.

As can be seen from the drawing, the adjustment apparatus may be either set into the B-column of a motor vehicle or else fitted on the B-column at a later stage. In order to protect the guide rail 11 from becoming soiled and thus affecting the free sliding of the sliding member 12 and also for optical reasons, the guide rail is covered. In the case of the guide rails fitted on the B-column, the cover consists of concertinas 21 which are pushed together or pulled apart in accordance with the movement of the sliding member 12.

In the case of a guide rail set into the B-column, it is also possible to use metal or plastic plates arranged in the form of coffers as the covering 24 for the slot. The plates of the covering can be pushed over one another or removed accordingly and each engage underneath the cladding 25 of the B-column.

In the same way, it is possible for the covering for the slot to be formed as metal or plastic discs arranged above and below the sliding member 12, which can be inserted as a whole in a gap provided between the B-column 10 and the cladding 25 thereof.

FIGS. 7 to 13 show another embodiment of the invention. Here the adjustment apparatus comprises a guide rail 110 in which a sliding member 111 is movably mounted. The guide rail 110 has a substantially C-shaped cross section so that a longitudinally directed guide slot 113 is formed between the guide flaps 112 thus produced. The guide flaps 112 each have, on each side of the slot 113, recesses 114 arranged at uniform spacing from one another and of trapezoidal construction, the shorter base line being located on the outer side of the guide rail 110. At the same time, the edges of the recesses 114 are inclined slightly inwardly in the upward direction.

The sliding member 111 which is movable in the guide rail 110 consists of a sliding shoe 115 which corresponds in shape to the inner contour of the guide rail 110. A carrier member 117 is integrally connected to the sliding shoe 115 via a web 116 guided in the guide slot 113. In the upper half of the carrier member 117, there are provided actuating elements 123 (which will be described more fully hereinafter) for releasing the sliding member 111; in the lower part there is a guide fitting 118 having a loop 119 and slot 120 for the insertion and guiding of a belt (not shown), this fitting 118 being secured by means of a screw 121. This screw is screwed into a bore 122 (FIG. 12) in the sliding member 111. In its upper part containing the actuating elements, the carrier member 117 projects by the thickness of the material of the guide fitting 118, so that the latter does not project forwardly beyond the sliding member 111.

Figure 12:
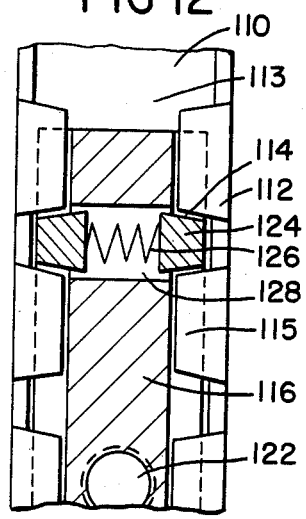
FIG. 12 is a longitudinal cross-sectional view through the apparatus on the line XII—XII in FIG. 8, in the locked position.
Figure 13:
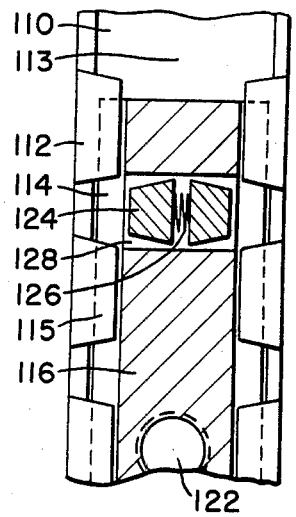
FIG. 13 is the longitudinal cross-sectional view of FIG. 12, in the released position.
Figure 21:
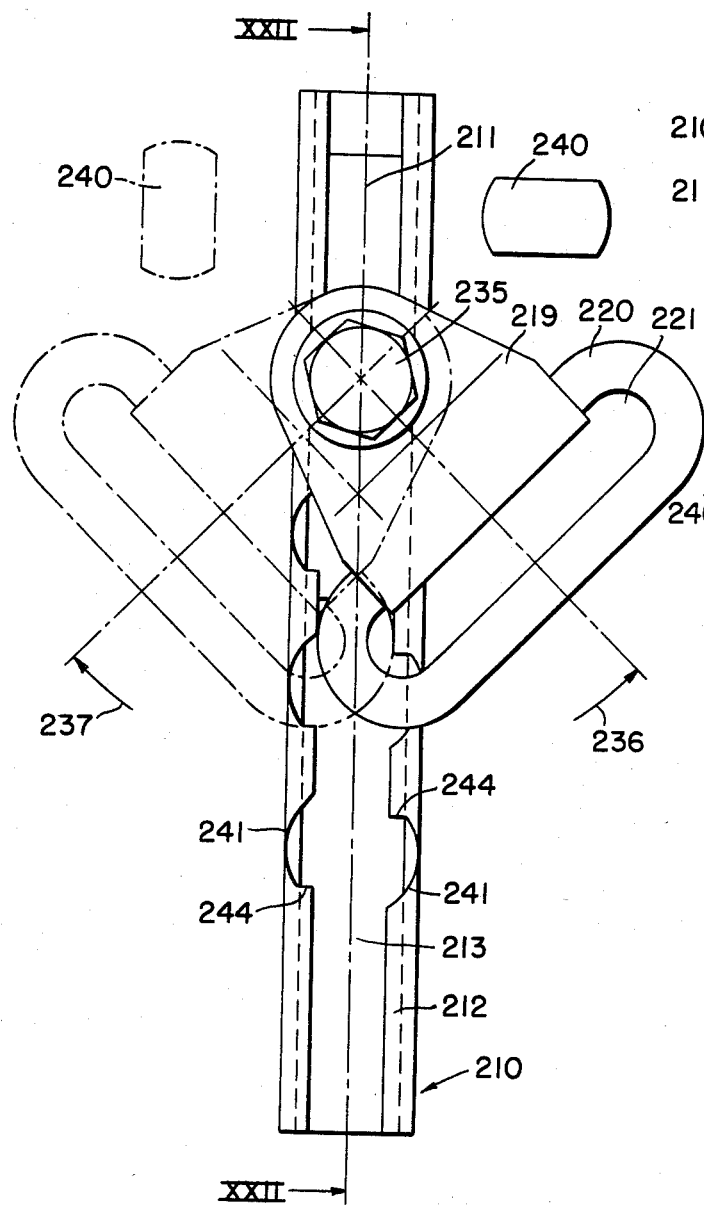
FIG. 21 is another embodiment of the adjustment apparatus, in front elevation.
Figure 22:
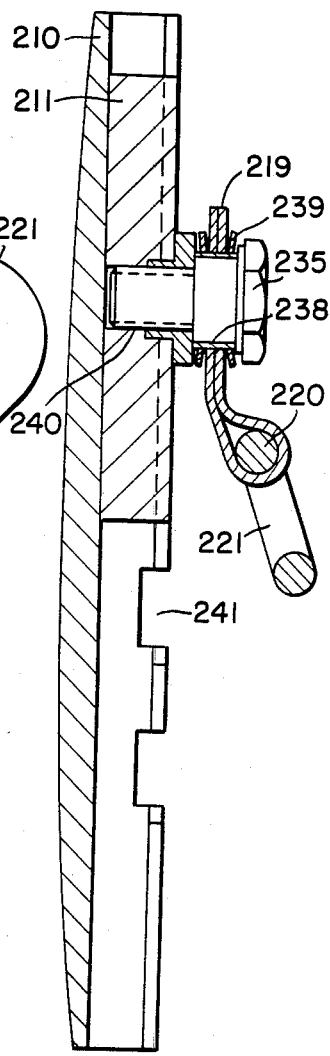
FIG. 22 shows the apparatus in central longitudinal section on the line XXII—XXII in FIG. 21.
Figure 23:
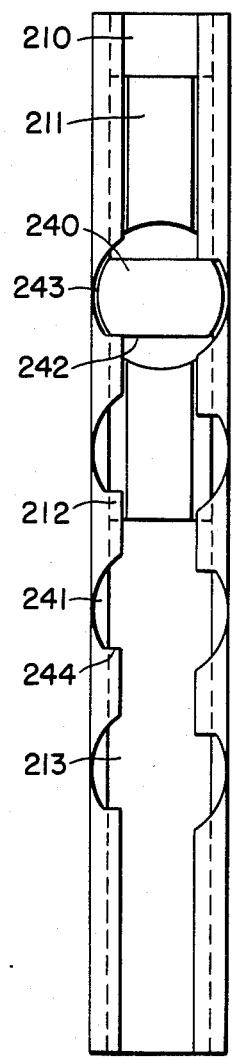
FIG. 23 shows apparatus in a front elevation view of the guide rail with locking member according to FIG. 21; in the locked position.
Figure 25:
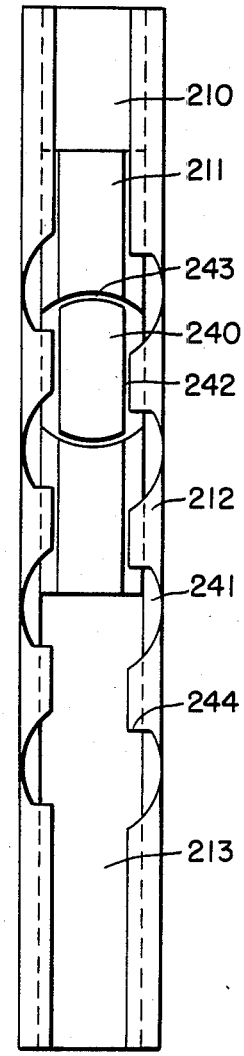
FIG. 25 is a view showing apparatus including the guide rail corresponding to FIG. 23 in the released position.
Figure 24:
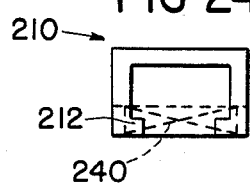
FIG. 24 is an end elevational view of the apparatus shown in FIG. 23.
Figure 26:
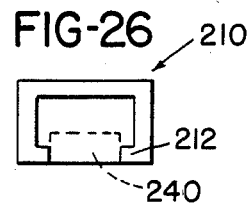
FIG. 26 is an end elevation of the object of FIG. 25.

The actuating elements are in the form of two push buttons 123 which are set into the carrier member 117 on each side of the vertical central line and project sideways out of the carrier member 117 of the sliding member 111. On each of the inner, facing ends of the push buttons 123 there is an integrally formed locking cam 124, pointing towards the bottom of the guide rail 110, these cams 124 corresponding in shape to the recesses 114 in the guide flaps 112 (FIGS. 12 and 13). In the region between the push buttons 123, the carrier member 117 further comprises a recess 125 in which there is mounted a helical spring 126 which pushes apart the push buttons 123 with locking cams 124. For this purpose, bores 127 are formed in the push buttons 123, in which the spring 126 is inserted and guided.

Figure 10:
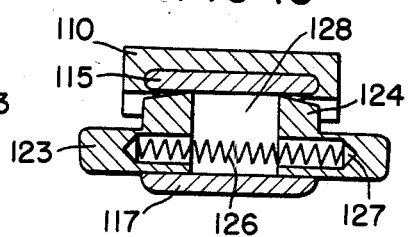
FIG. 10 is a cross-sectional view through the apparatus on the line X—X in FIG. 7 in the locked position.
Figure 11:
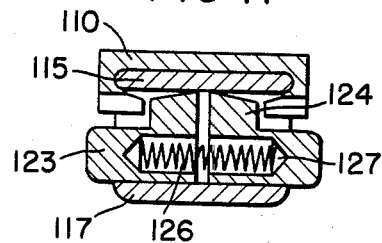
FIG. 11 is a cross-sectional view according to FIG. 10 in the released position.

The spacing of the push buttons 123 in the pushed-apart and hence locked position (FIG. 10) is such that, when the buttons 123 are compressed, the locking cams 124 are movable in the guide slot 113 of the guide rail 110. A recess 128 is provided in the carrier member 117 and web 116 as a space for the movement of the locking cams 124 when the push buttons 123 are compressed (FIGS. 10 and 12).

The adjustment apparatus operates as follows: in the locked position, the locking cams 124 formed on the push buttons 123 are fixed in the recesses 114 by the action of the spring 126 which pushes the push buttons 123 apart. Consequently, it is impossible for the sliding member 111 to slide along the guide rail 110. In order to actuate the adjustment apparatus, the push buttons 123 are pushed manually into the carrier member 117, up to a stop (not shown here) in the carrier member 117, causing the locking cams 124 to disengage from the recesses 114. Thus, the sliding member 111 together with the guide fitting 118 is movable in the guide rail 110 until the locking cams 124 drop into the next recesses 114, under the action of the spring 126, so that the sliding member 111 is again firmly locked in position in the guide rail 110.

It is particularly important that both push buttons 123 must always be pressed simultaneously to effect disengagement of the locking cams 124, thus preventing unintentional and accidental disengagement of the adjusting apparatus.

Although, not shown in detail here, the adjustment mechanism may either be mounted subsequently on the B-column of a motor vehicle or else provided inside the B-column from the outset. In the latter case, only the carrier member 117 projects out of the B-column into the interior of the vehicle.

Another embodiment is shown in FIGS. 14 to 20. In this apparatus, a sliding member 211 is movably mounted in a guide rail 210. The guide rail 210 is essentially C-shaped in cross section so as to produce a longitudinally directed guide slot 213 between the guide flaps 212 thus formed. The guide flaps 212 each comprise, on both sides of the slot 213, recesses 214 arranged at uniform spacings from one another and of trapezoidal construction, the shorter base line being situated on the outer side of the guide rail 210. At the same time, the edges of the recesses 214 are tapered slightly inwardly in the upward direction.

The sliding member 211 consists of a sliding shoe 215 which is movable inside the guide rail 210 and which has a web 216 passing through the guide slot 213. On the web 216, a cam member 218 is rotatably mounted, by means of a screw bolt 217, as a clamp for a fixing or guide member 219. On the end of the fitting 219 projecting over the cam member 218, there is a loop 220 with a slot 221 for the passage of a belt (not shown).

In order to secure the fitting 219, an L-shaped bushing 222 is mounted on the screw bolt 217. This bushing passes through the fitting abutting on the cam member 218 in a bore and engages over the surface thereof, so that the fitting 219 and the cam 218 cannot be jammed and prevented from rotating by pressure on the head of the screw. On the outer circumference of the cam member 218, there is also mounted a projection 218a enclosing the fitting 219, so that if the fitting is pivoted in the direction of the arrows 223, 224, this projection always rotates together with the cam member 218 about the screw 217. The pivot angle in the direction of the arrow 223, in the direction of travel of the vehicle, is about 45°, while the pivot angle in the direction of the arrow 224, counter to the direction of travel, is approximately 65°.

The sliding shoe 215 of the sliding member 211 is shaped to correspond to the inner contour of the guide rail 210 (FIG. 20). The thickness of the material of the sliding shoe 215 corresponds to approximately half the internal height of the guide rail 210. The other half is taken up by locking cams 225 mounted on the sliding shoe 215 on both sides of the web 216. These cams 225 correspond in their shape and arrangement to the recesses 214 in the guide rail 210.

Along the central longitudinal line of the sliding shoe 215 and web 216, there are two bores 226 for receiving securing pins 227. In the part facing the guide rail 210, the bores 226 have a larger diameter, over about three quarters of the height of the sliding shoe 215 and web 216, in order to receive helical springs 228 placed over the securing pins 227. The length of the securing pins 227 is somewhat greater than the height of the sliding member 211, with the result that the pins project on both sides; at one end, the pins have a round-headed configuration 229 abutting on the base of the guide rail 210, with dimensions corresponding to the diameter of the bores 226. Each spring 228 pushed over the securing pin 227 rests on a rounded head 229. The other end of the securing pins 227 extends through the bores 226 in the sliding shoe 215 or web 216 and into recesses 230 in the cam member 218.

The depth of the recesses 230 in the cam member 218 corresponds to the amount of the securing pin 227 which projects beyond the height of the sliding shoe 215 and web 216. The recesses 230 are milled as a curved groove in that surface of the cam member 218 abutting on the web 216, so that the securing pins 227 are guided in the recesses 230 when the cam member 218 is pivoted in the direction of the arrows 223, 224. At one end of the groove-like milled cam paths of the recesses 230 in question, when the cam member 218 is pivoted in the direction of the arrow 224, there is provided a depression 231 having a depth which corresponds to the thickness of the material of the locking cams 225.

The adjusting apparatus functions as follows: in the construction shown in FIG. 14, the sliding member 211 is held in a locked position in the guide rail 210 by the action of the pins 227, as the springs 228 mounted in the bores 226 of the sliding shoe 215 press the sliding shoe with its locking cams 225 against the guide flaps 212 of the guide rail 210, so that the locking cams 225 are fixed in the recesses 214. Since the locking cams and recesses are provided with suitable gradients, it is impossible for the apparatus to clatter.

When the cam member 218 is pivoted in the direction of the arrow 223, as happens when a person puts on the safety belt (FIG. 16), it is impossible for the sliding member 211 to become disengaged, since the securing pins 227 hold the cam member 218 at a spacing from the guide rail 210, so that the cam member 218 and fitting 219 cannot press in towards the base of the guide rail 210.

Such a pressing-in movement and hence disengagement of the sliding member 211 is only possible if the cam member 218 is rotated by hand in the direction of the arrow 224, i.e. counter to the buckling position (FIG. 17), into its end position, corresponding to a pivot angle of 65°. In this position, the depressions 231 in the cam member 218 are located in front of the ends of the securing pins 227, so that, when the cam member 218 is pressed counter to the force of the springs 228, these pins 227 are pushed into the bores 231. Since any pressure on the cam member 218 also causes the rounded heads 229 of the securing pins 227 to move into the bores 226 in the sliding shoe 215, the sliding shoe is moved downwards to the bottom of the guide rail 210. In this position, the locking cams 225 are released from the recesses 214 and the sliding member 211 is movable along the guide rail 210 into another position. If the pressure on the sliding member 211 is released, the springs 228 bring the sliding member 211 back into the locking position as shown in FIG. 14.

This locking action is not released even if the springs 228 are destroyed, for example in the event of a violent impact. In fact, except in the released position when the cam member 218 is pivoted through 65° in the direction of the arrow 224, the securing pins 227 hold the cam member 218, with the sliding shoe 215 coupled thereto by means of the screw 217, at a spacing from the bottom of the guide rail 210, in every other position, particularly in the putting-on position of the belt, so that the locking cams 225 cannot move out of the recesses 214.

In another embodiment by way of example shown in FIGS. 21 to 26, the locking and releasing of the sliding member 211 in the guide rail 210 is effected directly by the manual rotation of the guide fitting 219, while the fitting is placed in the correct vertical position by means of a so-called ball notch.

The sliding member 211 produced without locking cams is displaceable in the guide rail 210. The fitting 219 is secured to the sliding member 211 via a screw 235, the fitting 219 having a pivot range, starting from the removal position, of 45° in the buckling position (arrow 236) and in the adjusting position (arrow 237). Between the fitting 219 and the sliding member 211, a circular disc 238 is mounted on the screw 235 as a carrier for the locking member, and this disc 238 always rotates together with the fitting 219 under the action of spring rings 239.

The circular disc 238 corresponds in diameter to the width of the guide rail 210 and partly abuts on the guide rail 210; one projection 240 thereof extends through the guide slot 213 into the sliding member 211. In the region between the guide flaps 212, the circular disc 238 engages with its projection 240 in recesses 241 in the guide flaps 212. The projection 240 of the circular disc 238 is formed by a segment of the circular disc 238 which is bounded by two parallel chords 242 that form a right angle with the longitudinal axis of the guide rail 210 in the locking position of the apparatus. The perpendicular spacing of the two chords 242 corresponds to the width of the guide slot 213, so that the projection 240 can slide therein parallel to the guide slot 213.

The recesses 241 are circular, to correspond to the arcs 243 of the projection 240 of the circular disc remaining between the chords 242, with a radius corresponding to that of the circular disc 238. The recesses 241 located opposite one another on both sides of the guide slot 213 comprise stops 244 for the projection 240 of the circular disc 238, offset from one another at the upper and lower end of said slot 213. The vertical spacing between the stops corresponds to the height of the segment 240.

This embodiment of the adjusting apparatus operates as follows: in the buckling position, the fitting 219 is pivoted through 45° in the direction of the arrow 236. The projection 240 of the circular disc 238 is pivoted into the recesses 241 in the guide rail 210 and abuts on the stops 244 of the recesses 241 in the guide rail 210, thus preventing any vertical adjustment of the fitting 219 in the buckling position.

In the belt removal position, the fitting 219 is pivoted back through 45° into its original position, i.e. the circular disc 238 with its projection 240 has also completed a rotation through 45°. In this position it is again impossible to adjust the height of the fitting 219 owing to the fact that the arcs 243 of the projection 240 of the circular disc abut on the circular recesses 241.

Only when the fitting 219 is pivoted further through 45° into the adjusting position (arrow 237)—away from the buckling position—does the projection 240 of the circular disc 238 move out of engagement with the recesses 241. The chords 242 of the projection 240 of the circular disc are now parallel to the guide flaps 212 of the guide rail 210, thus permitting longitudinal movement of the projection 240 of the circular disc in the guide slot 213 and thus enabling vertical adjustment of the fitting 219. Although this is not shown in detail in the drawings, the correct position of the locking member 240 relative to the recesses 241 may be indicated by a so-called ball notch, whereby a ball mounted under spring pressure in the sliding member 211, between the sliding member 211 and guide rail 210, engages in correspondingly disposed recesses in the bottom of the guide rail 210.

In another embodiment by way of example of the apparatus according to FIGS. 27 to 29, a rotary knob 245 is mounted independently of, i.e. separately from, the fastening means of the fitting 219 on the sliding member 211 to act as a handle for releasing the fitting 219. In this embodiment, the fitting 219 is constructed as an emergency buckle 246 for the associated safety belt, and is fixed to the sliding member 211 by means of a screw 247. In the view shown in FIG. 28, the adjusting apparatus is provided with a cover 248.

The guide rail 210 is formed with a longitudinally directed guide slot 213 between guide flaps 212 which do not have any recesses. Circular recesses 249, the spacing of which corresponds to the desired degree of adjustment of the fitting, are provided in the bottom of the guide rail 210 nearest the vehicle bodywork.

The sliding member 211 is movably guided in the guide rail 210; in its upper region, independently of the fastening of the emergency buckle 246, this sliding member 211 has a bore 250 for receiving a bolt 251 which is longitudinally movable therein. The bolt 251 rests on the foot of a control rod 252 which extends from the bolt 251 through the sliding member 211 to the rotary knob 245 and is connected thereto. On the control rod 252, at right angles to the longitudinal axis thereof, a pin 253 is mounted engaging in a flanged guide bushing 254 inserted between the guide rail 210 and cover 248 and surrounding the control rod 252 with some play. In the annular space 255 between the control rod 252 and the guide bushing 254 there is a helical tension spring 256 which is secured at one end to the guide bushing 254 and is suspended at the other end from the control rod 252.

The adjusting apparatus according to this embodiment operates as follows: in the locking position, the bolt 251 guided in the bore 250 of the sliding member 211 is mounted in the recess 249 in the bottom of the guide rail 210 and thus locks the sliding member 211 to the rail 210. When the rotary knob 245 is rotated through 90°, the control rod 252 is rotated simultaneously, thus lifting the bolt 251 out of the recess 249, by means of the guiding of the pin 253 in the guide bushing 254 via the control rod 252, and in this way the sliding member 211 is released.

Since, at the same time, the rotary knob 245 is raised from the cover 248 of the adjusting apparatus by the amount of longitudinal movement of the control rod 252, no pressure should be exerted thereon in the direction of the guide rail 210 when the rotary knob 245 is actuated, so as not to impede the release of the sliding member 211 when the bolt 251 is lifted out of the recess 249.

The longitudinal movement of the control rod 252 tensions the spring 256 which allows the bolt 251 to re-engage in a recess 249 after the sliding member 211 has been moved up to the desired height. As a result of the connection between the control rod 252 and rotary knob 245, the rotary knob 245 is also automatically turned back to its original position.

The next embodiment is illustrated in FIG. 30 and relates to the adjustment of the pivotal point by means of a pinion and toothed rack. The upper part of the B-column 310 of a vehicle body comprises, on the side directed towards the interior of the vehicle, an oblong recess 311 in the region of which a guide rail 312 of C-shaped cross section is secured in the roof post. A sliding member or slide 313 is mounted so as to be longitudinally movable inside the rail. Facing the interior of the vehicle, the sliding member 313 has a fixing bolt 314 for pivotally mounting a guide fitting 315 for the belt 316 of a shoulder belt, which forms part of a three-point belt (not shown). The fixing bolt 314 extends outwardly through the longitudinal opening 317 in the sliding member 313, i.e. into the interior of the vehicle.

Inside the B-column 310, to the side of the guide rail 312, there is mounted an electric motor 318 which is connected by an electrical cable 330 to an operating key 329 within the reach of the seated person who is to wear the belt. The operating key 329 is operatively connected to the electric supply system of the vehicle. The arrangement of the electric motor 318 relative to the guide rail 312 is such that the rotor shaft 319 of the motor extends at right angles to the guide plane of the sliding member 313. On its power take-off side, the rotor shaft 319 carries a pinion 320 which meshes directly with a toothed rack 321 tht is formed by the outer edge of the sliding member 313 shown on the left in FIG. 30. For example, the teeth of the toothed rack 321 are integrally formed on the sliding member 313 or are machined thereon. The meshing teeth of the piston 320 and toothed rack 321 are basically quadrilateral, taking into account the flank shape required, so that the top surfaces of the teeth on the toothed rack 321 abut flatly inside the contour of the guide rail 312 and are able to slide downwards when they and hence the sliding member 313 are moved by the pinion 320.

As can be seen from FIG. 30, on the right-hand longitudinal edge of the sliding member 313, there are also teeth 322 integral therewith, which consist of triangular teeth, unlike the toothed rack 321. These teeth can mesh with corresponding teeth of an internal set of teeth 323 formed in the associated inner arc of the profile of the guide rail 312. This meshing does not occur permanently, since the transverse dimensions of the sliding member 313 are so much smaller than the relevant internal dimensions of the guide rail 312 consequently, a clearance is produced between the guide rail and sliding member just large enough to keep the second set of teeth 322, 323 out of engagement, i.e. so as not to impede the longitudinal movement of the sliding member 313 in the guide rail 312. This is achieved by means of a leaf spring (not shown) which is mounted directly or indirectly between the guide rail 312 and sliding member 313 and causes the sliding member 313 to be pushed constantly to the left in FIG. 30 under the effect of spring force. Certainly, the force of this leaf spring is less than the belt force in the direction of the arrow 324 in the event of an accident or sudden braking, with the result that the sliding member 313 as shown in FIG. 30 is then pulled to the right, through the clearance, to cause the second set of teeth 322, 323 to mesh. Due to the adequate length of the teeth or depth of the gaps between the teeth in the sets of teeth 320, 321, these teeth do not disengage and consequently, when the sliding member 313 is reset under the effect of the leaf spring mentioned above, actuation of the adjustment apparatus is again readily possible.

During operation, the person who wishes to put on the belt in the prescribed manner presses the key to actuate the motor 318 and hence the pinion 320, which moves the sliding member 313 up or down via the toothed rack 321 and in this way adjusts the fitting 315 to the correct height. This may be done step by step. At the same time, the teeth in the second set of teeth 322, 323 move past one another without locking, due to the action of the leaf spring mentioned hereinbefore. If there is an accident or some other occurrence involving great force on the belt, the belt 316 pulls the fitting 315 and hence the sliding member 313 into the locking position in which the teeth 322 and 323 mesh. Thus, the vertical position of the pivotal point consisting of the fitting 315 is fixed. When the belt is put on and taken off, with the consequent belt forces, the meshing action of the first set of teeth 320, 321 is sufficient to hold the sliding member 313 at the desired height.

Finally, FIGS. 31 and 32 show another embodiment by way of example with an electrical adjustment mechanism, wherein the meshing mechanism, unlike that in FIG. 30, consists of a threaded spindle and threaded nut. Here, the roof post or door upright is not shown, for the sake of keeping the drawings simple, but only the guide rail 312, sliding member 313, fixing bolt 314 and guide fitting 315 are shown. The direction of the view is turned through 90° compared with FIG. 30.

Here, the electric motor 318 is located at the top of the guide rail 312 in an arrangement such that the axis is at right angles to the rotor shaft of the motor (not shown). The power take-off side of the rotor shaft is coupled to a threaded spindle 325 which extends longitudinally through the internal space in the C-shaped profile of the guide rail 312 along to the lower end opposite the motor 318. There, the threaded spindle 325 is mounted so as to be readily rotatable in an abutment 326. This abutment forms part of a lower fixed end plate 327 of the guide rail 312.

The sliding member 313, which is shown in transverse section in FIG. 32, contains a threaded nut 328 (inserted or cast therein) which registers with the threaded spindle 325 and when rotated moves up and down thereon in the vertical direction together with the sliding member 313, depending on the manner in which the electric motor 318 is actuated via the operating key 329.

The various degrees of belt force produced when the belt is put on, wound back into the belt reeling mechanism after being taken off, when the vehicle brakes or in the event of an accident, are absorbed as a function of their direction, by the guide rail 312 and threaded spindle 325 in complementary manner. There should be borne in mind that absolutely vertical force as the sum of all the belt forces on the threaded spindle 325 does not occur in practice. If the guide rail 312 and sliding member 313 are suitably matched to each other in shape, the guide rail 312 absorbs the majority of the belt forces transmitted via the sliding member 313, so that the vertical adjustment of the guide fitting 315 and hence the correct belt configuration are always maintained.

A hand or finger wheel may be connected to the pinion 320, the shaft 319 thereof or the threaded spindle 325. This hand or finger wheel projects appreciably, with at least part of its periphery, into the interior of the vehicle so that the meshing mechanism in question can be actuated and vertical adjustment can be achieved, even if the current supply to the electric motor 318 should fail.

The power take-off member 320, 325 of the electric motor 318 may also be indirectly connected to the motor, for example via an arrangement such as a flexible shaft in the manner of a Bowden drive or a Cardan shaft with universal joints or the like. Such arrangement makes possible mounting of the electric motor at some distance from the guide rail 312 if there is no room to mount the motor immediately adjacent the guide rail 312 and to have the motor act directly on the pinion 320 or the threaded spindle 325 of the meshing mechanism in question.

The apparatus for adjusting the height of the upper fixing or guide fitting constructed according to the invention may make a substantial contribution to ensuring that drivers, in particular, generally make more use of their safety belts, by being more prepared to put on the belt. This not only provides better protection for the life of the individual but also has advantages in economic terms, since the number of absences from work caused by injury resulting from safety belts not being worn is reduced. Any measure which increases the comfort of putting on and wearing safety belts will also increase the number of belts worn. Consequently, the invention is of great commercial utility, since it serves both comfort and safety.

The features disclosed in the specification, claims, abstract and drawings may be essential to the realization of the invention with features of different embodiments, both individually and in any desired combinations with one another.

We claim:

1. An apparatus for adjusting the height of the upper fixing or guide fitting for the shoulder belt of a safety belt system, with said belt being looped through said fitting, resulting in a belt looping axis; said apparatus comprising:
   a guide rail having a guide slot and recesses;
   a sliding member which is movable within said guide slot of said guide rail, said fixing or guide fitting being supported on said sliding member;
   at least one locking member mounted on said sliding member and adapted to engage in said recesses of said guide rail for selective locking and releasing of said sliding member relative to said guide rail, said at least one locking member being symmetrical in construction with regard to its locking and releasing function; said belt looping axis, at said fixing or guide fitting, being located externally of the zone in which the forces between said at least one locking member and said guide rail are transmitted along a plane, a line, or pointwise when said sliding member is locked relative to said guide rail; and
   operating means for selectively locking said at least one locking member into, and releasing it from, said recesses of said guide rail to effect said selective locking and releasing of said sliding member relative to said guide rail; said operating means having a finger pressure construction to permit operating thereof with one hand and with substantially no force of hand and arm, a spring-loaded locking member which is longitudinally movable at right angles to the direction of slide of said sliding member; and in which said operating means for selectively locking and releasing said lockingmember is in the form of a sliding key which is movable parallel to said guide rail in the manner of a known belt buckle having a PRESS buttom, and, by means of suitable configuration, controls the longitudinal movements of said locking member.

2. An apparatus according to claim 1, which includes a housing mounted on said sliding member, said sliding key being mounted in said housing and being guided in a straight line thereby; said finger pressure construction, for said one-handed operation of said sliding member, including a finger place on said sliding key, and a shoulder on said housing opposite said finger place.

3. An apparatus according to claim 2, in which said housing is provided with finger indentations along its longitudinal sides.

4. An apparatus according to claim 1, in which said sliding key is provided with projections which overlap said locking member in its locking position and prevent its release.

5. An apparatus according to claim 2, which includes a leaf spring within said housing clamped at one end to said housing, the other end being mounted on said locking member to effect said spring-loading thereof towards said locking position.

6. An apparatus according to claim 2, which includes a guide element within and attached to said housing, and a cooperating matching configuration in said sliding key, with a compression spring being disposed therebetween.

7. An apparatus according to claim 6, in which said sliding key is provided with at least one ramp-like arrangement, and in which said locking member is provided with an associated surface which is adapted to slide up and down along said ramp-like arrangement over the distance required for release of said locking member.

8. An apparatus according to claim 7, in which said sliding member is provided with an opening for guiding said locking member, and in which said housing is provided with a base plate which is spaced from said sliding member and has an opening for said locking member, said opening of said base plate being aligned with said opening of said sliding member.

9. An apparatus according to claim 8, in which said sliding key is box-shaped and, for limiting its sliding movement, is provided with at least one abutment surface which extends at right angles to the direction of sliding.

10. An apparatus according to claim 9, in which said housing and said sliding key are provided with cooperating tongue and groove arrangements for holding and guiding them relative to one another.

11. An apparatus according to claim 1, in which said locking member is a flat T-shaped stamped sheet metal part.

12. An apparatus according to claim 2, which includes three bolt connections for connecting said housing and said fixing or guide fitting to said sliding member.

13. An apparatus according to claim 2, in which said sliding member at least indirectly supports a cover plate for said guide rail, said cover plate moving with said sliding member.

14. An apparatus according to claim 13, in which said cover plate is constructed in two parts, and is fixed to said housing and to said fixing or guide fitting.

15. An apparatus according to claim 1, which includes at least one sleeve, for receiving and bridging any changes in length, disposed between said sliding member and said guide rail.

16. An apparatus according to claim 15, in which said sleeve is constructed as a bellows-like arrangement.

17. An apparatus according to claim 16, in which said sliding member includes a bellows-like arrangement at both ends.

18. An apparatus for adjusting the height of the upper fixing or guide fitting for the shoulder belt of a safety belt system, with said belt being looped through said fitting, resulting in a belt looping axis; said apparatus comprising:

a guide rail having a guide slot and recesses;
a sliding member which is movable within said guide slot of said guide rail, said fixing or guide fitting being supported on said sliding member;
at least one locking member mounted on said sliding member and adapted to engage in said recesses of said guide rail for selective locking and releasing of said sliding member relative to said guide rail, said at least one locking member being symmetrical in construction with regard to its locking and releasing function; said belt looping axis, at said fixing or guide fitting, being located externally of the zone in which the forces between said at least one locking member and said guide rail are transmitted along a plane, a line, or pointwise when said sliding member is locked relative to said guide rail; and
operating means for selectively locking said at least one locking member into, and releasing it from, said recesses of said guide rail to effect said selective locking and releasing of said sliding member relative to said guide rail; said operating means having a finger pressure construction to permit operating thereof with one hand and with substantially no force of hand and arm, said operating means for selectively locking and releasing said locking member being a rotatably mounted handle which is coupled to said locking member in such a way that by turning said handle, said sliding member can be released with one hand to adjust the height of said fixing or guide fitting, said fixing or guide fitting being said handle, said locking members of said sliding member being in the form of locking cams, with said fixing or guide fitting being indirectly coupled thereto, said sliding member being spring-loaded at right angles to the longitudinal direction of said guide rail, and comprises a sliding shoe which is movable in said guide rail and on which said locking cams are formed, and a web which is associated with said sliding shoe and passes through said guide slot of said guide rail; and which includes a cam member which is rotatably fastened on said web for selectively securing and releasing said sliding member in said rail by rotation; said fixing or guide fitting being fixed on said cam member, on the outer edge of which is mounted a circumferential projection which encloses said fitting in such a way that said cam member can be made to rotate by rotation of said fitting, said sliding member, with said cam member, being adapted to be pressed into said guide rail only when said cam member, via said fitting, is pivoted through an angle of 65° counter to the direction of travel of a unit in which said apparatus is being utilized, said sliding shoe and web being provided with a continuous bore, and said locking means comprising at least one securing pin which is inserted in said continuous bore and having a rounded head which rests on the bottom of said guide rail, with the length of said at least one securing pin projecting beyond the height of said sliding shoe and web, the diameter of said continuous bore in said sliding shoe and web corresponding at least partially to the diameter of said rounded head of said securing pin, with the diameter of that part of said bore which is remote from said rounded head being less than the diameter of the remainder of said bore, thereby forming a shoulder in this location.

19. An apparatus according to claim 18, which includes, in the larger diameter portion of said bore, a helical spring which is disposed about said securing pin; said helical spring rests on said rounded head and on said shoulder of said bore, and braces said sliding member relative to the bottom of said guide rail.

20. An apparatus for adjusting the height of the upper fixing or guide fitting for the shoulder belt of a safety belt system, with said belt being looped through said fitting, resulting in a belt looping axis; said apparatus comprising:

a guide rail having a guide slot and recesses;
a sliding member which is movable within said guide slot of said guide rail, said fixing or guide fitting being supported on said sliding member;
at least one locking member mounted on said sliding member and adapted to engage in said recesses of said guide rail for selective locking and releasing of said sliding member relative to said guide rail, said at least one locking member being symmetrical in construction with regard to its locking and releasing function; said belt looping axis, at said fixing or guide fitting, being located externally of the zone in which the forces between said at least one locking member and said guide rail are transmitted along a plane, a line, or pointwise when said sliding member is locked relative to said guide rail; and
operating means for selectively locking said at least one locking member into, and releasing it from, said recesses of said guide rail to effect said selective locking and releasing of said sliding member relative to said guide rail; said operating means having a finger pressure construction to permit operating thereof with one hand and with substantially no force of hand and arm; said operating means for selectively locking and releasing said locking member being a rotatably mounted handle which is coupled to said locking member in such a way that by turning said handle, said sliding member can be released with one hand to adjust the height of said fixing or guide fitting, said fixing or guide fitting being said handle, said locking members of said sliding member being in the form of locking cams, with said fixing or guide fitting being indirectly coupled thereto, said sliding member being springloaded at right angles to the longitudinal direction of said guide rail, and comprises a sliding shoe which is movable in said guide rail and on which said locking cams are formed, and a web which is associated with said sliding shoe and passes through said guide slot of said guide rail; and which includes a cam member which is rotatably fastened on said web for selectively securing and releasing said sliding member in said rail by rotation; said fixing or guide fitting being fixed on said cam member, on the outer edge of which is mounted a circumferential projection which encloses said fitting in such a way that said cam member can be made to rotate by rotation of said fitting, said sliding member, with said cam member, being adapted to be pressed into said guide rail only when said cam member, via said fitting, is pivoted through an angle of 65° counter to the direction of travel of a unit in which said apparatus is being utilized, said sliding shoe and web being provided with a continuous bore, and said locking means comprising at least one securing pin which is inserted in said continuous bore and having a rounded head which rests on the bottom of said guide rail, with the length of said at least one securing pin projecting beyond the height of said sliding shoe and web, said cam member, on that side facing said sliding shoe, being provided with a curved recess for receiving that end of said securing pin which projects beyond said sliding shoe and web and is remote from said rounded head; this projecting and remote end of said securing pin being guided in said recess of said cam member when the latter is rotated, with the depth of said recess of said cam member corresponding to the amount by which said securing pin projects beyond said web.

21. An apparatus according to claim 20, which includes a depression on that end of said recess of said cam member which corresponds to the rotation of the latter counter to said direction of travel, said depression being deeper than said curved recess by the extent of penetration of said sliding member into said guide rail.

22. An apparatus for adjusting the height of the upper fixing or guide fitting for the shoulder belt of a safety belt system, with said belt being looped through said fitting, resulting in a belt looping axis; said apparatus comprising:
a guide rail having a guide slot and recesses;
a sliding member which is movable within said guide slot of said guide rail, said fixing or guide fitting being supported on said sliding member;
at least one locking member mounted on said sliding member and adapted to engage in said recesses of said guide rail for selective locking and releasing of said sliding member relative to said guide rail, said at least one locking member being symmetrical in construction with regard to its locking and releasing function; said belt looping axis, at said fixing or guide fitting, being located externally of the zone in which the forces between said at least one locking member and said guide rail are transmitted along a plane, a line, or pointwise when said sliding member is locked relative to said guide rail;
operating means for selectively locking said at least one locking member into, and releasing it from, said recesses of said guide rail to effect said selective locking and releasing of said sliding member relative to said guide rail; said operating means having a finger pressure construction to permit operating thereof with one hand and with substantially no force of hand and arm; said operating means for selectively locking and releasing said locking member being a rotatably mounted handle which is coupled to said locking member in such a way that by turning said handle, said sliding member can be released with one hand to adjust the height of said fixing or guide fitting, said fixing or guide fitting being said handle, said fixing or guide fitting being coupled directly to said locking member; and
a circular disc mounted between said sliding member and said fixing or guide fitting and rotating with the latter; said guide rail including guide flaps in which said recesses of said guide rail are located; and said circular disc including a substantially rectangular projection, which, as a locking member, projects into said guide rail and is adapted to engage said recesses in said guide flaps of said guide rail; said fitting, with said circular disc and said projection, being pivotal about a quarter of a circle out of a belt removal position into a belt buckling position, whereupon said projection is adapted to be locked to said guide rail.

23. An apparatus according to claim 22, in which said projection of said circular disc is formed by a segment of a circle bounded by two parallel chords spaced from one another by a distance corresponding to the width of said guide slot of said guide rail, with said chords forming right angles with the longitudinal axis of said guide rail in the locking position of said apparatus; and in which said recesses in said guide flaps of said guide rail are circular, corresponding to the radius of said circular disc; opposing, cooperating recesses, offset at their diagonally opposing ends, are provided with stops for said projection of said circular disc, with the distance between cooperating stops, as measured in the longitudinal direction of said guide rail, corresponding to the segment height, i.e. said distance between said parallel chords, of said projection of said circular disc.

24. An apparatus for adjusting the height of the upper fixing or guide fitting for the shoulder belt of a safety belt system, with said belt being looped through said fitting, resulting in a belt looping axis; said apparatus comprising:
a guide rail having a guide slot and recesses;
a sliding member which is movable within said guide slot of said guide rail, said fixing or guide fitting being supported on said sliding member;
at least one locking member mounted on said sliding member and adapted to engage in said recesses of said guide rail for selective locking and releasing of said sliding member relative to said guide rail, said at least one locking member being symmetrical in construction with regard to its locking and releasing function; said belt looping axis, at said fixing or guide fitting, being located externally of the zone in which the forces between said at least one locking member and said guide rail are transmitted along a plane, a line, or pointwise when said sliding member is locked relative to said guide rail;
operating means for selectively locking said at least one locking member into, and releasing it from, said recesses of said guide rail to effect said selective locking and releasing of said sliding member relative to said guide rail; said operating means having a finger pressure construction to permit operating thereof with one hand and with substantially no force of hand and arm; said operating means for selectively locking and releasing said locking member being a rotatably mounted handle which is coupled to said locking member in such a way that by turning said handle, said sliding member can be released with one hand to adjust the height of said fixing or guide fitting, said handle is a rotary knob mounted on said sliding member, separately from said fixing or guide fitting, for the purpose of releasing said locking member; in which said sliding member is provided with a bore; in which said rotary knob includes a control rod connected thereto; and in which said locking member is a bolt arranged at the base of said control rod remote from said rotary knob, said bolt being movably received in said bore of said sliding member; and a flanged guide busing which is provided with guide means and surrounds said control rod with play so as to form an annular space therebetween; said control rod being provided with a pin which projects therefrom and is guided in said guide means of said bushing in such a way as to produce longitudinal movements of said control rod; and a helical tension spring arranged in said annular space between said control rod and said guiding bushing, one end of said spring being secured to said guide bushing, and the other end of said spring being secured to said control rod.

25. An apparatus according to claim 1, in which said operating means includes an electrical device which is adapted to be connected to a source of electrical power, said electrical device being operatively associated with said at least one locking member for selective release and locking of the latter, and hence for selective release and locking of said sliding member relative to said guide rail.

26. An apparatus for adjusting the height of the upper fixing or guide fitting for the shoulder belt of a safety belt system, with said belt being looped through said fitting, resulting in a belt looping axis; said apparatus comprising:

a guide rail having a guide slot and recesses;

a sliding member which is movable within said guide slot of said guide rail, said fixing or guide fitting being supported on said sliding member;

at least one locking member mounted on said sliding member and adapted to engage in said recesses of said guide rail for selective locking and releasing of said sliding member relative to said guide rail, said at least one locking member being symmetrical in construction with regard to its locking and releasing function; said belt looping axis, at said fixing or guide fitting, being located externally of the zone in which the forces between said at least one locking member and said guide rail are transmitted along a plane, a line, or pointwise when said sliding member is locked relative to said guide rail; and operating means for selectively locking said at least one locking member into, and releasing it from, said recesses of said guide rail to effect said selective locking and releasing of said sliding member relative to said guide rail; said operating means having a finger pressure construction to permit operating thereof with one hand and with substantially no force of hand and arm; said operating means includes an electrical device which is adapted to be connected to a source of electrical power, said electrical device being operatively associated with said at least one locking member for selective release and locking of the latter, and hence for selective release and locking of said sliding member relative to said guide rail, said electrical device being an electric motor which includes a power take-off member; said sliding member and said power take-off member being constructed as a cooperating meshing mechanism for moving said sliding member in said guide rail, with said power take-off member including a pinion, and part of said sliding member being in the form of a toothed rack forming said cooperating meshing mechanism; and a first further set of teeth in said sliding member, a second further set of teeth in said guide rail, and a spring which attempts to maintain a clearance between said further sets of teeth, with the latter meshing only when said first further set of teeth of said sliding member is pulled under the effect of belt force into said second further set of teeth of said guide rail counter to the force of said spring which attempts to maintain said clearance.

27. An apparatus according to claim 26, in which said spring which attempts to maintain said clearance between said further sets of teeth of said sliding member and said guide rail is a compression-type leaf spring.

28. An apparatus according to claim 26, in which said toothed rack of said sliding member has rectangular teeth, and in which said guide rail is provided opposite said second further set of teeth thereof with a sliding surface for said toothed rack.

29. An apparatus according to claim 26, in which length of the teeth, i.e. the depth of the gaps between said teeth, of said pinion and toothed rack of said meshing mechanism, is great enough to permit bridging of said clearing between said sliding member and said guide rail when said further sets of teeth mesh, without affecting the meshing engagement of said pinion and said toothed rack.

30. An apparatus according to claim 25, in which said electrical device is an electric motor which includes a power take-off member in the form of a threaded spindle; and in which part of said sliding member is in the form of a threaded nut forming said locking member and meshingly engaging said threaded spindle.

31. An apparatus according to claim 30, in which said sliding member is provided with a longitudinal bore through which said threaded spindle is passed without making contact, and in which said threaded nut, which is comparatively short in relation to said threaded spindle, is inserted in said longitudinal bore.

32. An apparatus according to claim 30, in which said guide rail is provided with an end plate in the form of an abutment, and in which that end of said threaded spindle remote from said motor is guided in said abutment.

33. An apparatus according to claim 30, in which said threaded spindle is arranged along the center of said guide rail and supports a hand wheel, at least a portion of which projects through said guide rail into the interior of a unit in which said apparatus is being utilized; said motor is disposed at one end of said guide rail.

34. An apparatus according to claim 25, in which said electrical device is an electric motor which includes a driving part, and therebetween a drive connection in the form of a flexible shaft in the manner of a Bowden cable.

35. An apparatus according to claim 25, in which said electrical device is an electric motor which includes a driving part, and therebetween a driving connection in the form of a Cardan drive with joints for bridging the change in direction of said drive.

* * * * *